US010949661B2

(12) United States Patent
Bhotika et al.

(10) Patent No.: US 10,949,661 B2
(45) Date of Patent: Mar. 16, 2021

(54) LAYOUT-AGNOSTIC COMPLEX DOCUMENT PROCESSING SYSTEM

(71) Applicant: Amazon Technologies, Inc., Seattle, WA (US)

(72) Inventors: Rahul Bhotika, Bellevue, WA (US); Shai Mazor, Binyamina (IL); Amit Adam, Haifa (IL); Wendy Tse, Seattle, WA (US); Andrea Olgiati, Gilroy, CA (US); Bhavesh Doshi, Redmond, WA (US); Gururaj Kosuru, Bellevue, WA (US); Patrick Ian Wilson, Renton, WA (US); Umar Farooq, Mercer Island, WA (US); Anand Dhandhania, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 172 days.

(21) Appl. No.: 16/198,040

(22) Filed: Nov. 21, 2018

(65) Prior Publication Data
US 2020/0160050 A1 May 21, 2020

(51) Int. Cl.
G06K 9/00 (2006.01)

(52) U.S. Cl.
CPC ..... *G06K 9/00456* (2013.01); *G06K 9/00449* (2013.01); *G06K 9/00463* (2013.01)

(58) Field of Classification Search
CPC .......... G06K 9/00456; G06K 9/00449; G06K 9/00463
See application file for complete search history.

(56) References Cited

U.S. PATENT DOCUMENTS

| 9,348,920 | B1* | 5/2016 | Kesin | G06F 16/31 |
|---|---|---|---|---|
| 9,477,777 | B2* | 10/2016 | Stankiewicz | G06F 16/355 |
| 9,485,265 | B1* | 11/2016 | Saperstein | G06F 16/24544 |
| 10,318,630 | B1* | 6/2019 | Kesin | G06F 40/284 |
| 10,410,136 | B2* | 9/2019 | Zhang | G06Q 10/063 |
| 10,437,837 | B2* | 10/2019 | Wang | G06F 16/93 |
| 10,452,651 | B1* | 10/2019 | Palou | G06F 16/245 |
| 2005/0065975 | A1* | 3/2005 | McDonald | G06F 40/35 |

(Continued)

OTHER PUBLICATIONS

Non-Final Office Action, U.S. Appl. No. 16/147,018, dated May 1, 2020.

(Continued)

*Primary Examiner* — Lewis G West
(74) *Attorney, Agent, or Firm* — Nicholson De Vos Webster & Elliott, LLP

(57) ABSTRACT

Techniques for layout-agnostic complex document processing are described. A document processing service can analyze documents that do not adhere to defined layout rules in an automated manner to determine the content and meaning of a variety of types of segments within the documents. The service may chunk a document into multiple chunks, and operate upon the chunks in parallel by identifying segments within each chunk, classifying the segments into segment types, and processing the segments using special-purpose analysis engines adapted for the analysis of particular segment types to generate results that can be aggregated into an overall output for the entire document that captures the meaning and context of the document text.

20 Claims, 14 Drawing Sheets

(56) References Cited

U.S. PATENT DOCUMENTS

| | | | | |
|---|---|---|---|---|
| 2005/0182736 A1* | 8/2005 | Castellanos | ............ | G06F 40/295 |
| | | | | 705/80 |
| 2007/0061755 A1* | 3/2007 | Taboada | ................ | G06F 3/0481 |
| | | | | 715/818 |
| 2007/0168382 A1* | 7/2007 | Tillberg | ............. | G06K 9/00449 |
| 2011/0099133 A1* | 4/2011 | Chang | ................... | G06F 16/353 |
| | | | | 706/12 |
| 2015/0032645 A1* | 1/2015 | McKeown | ............. | G06Q 50/18 |
| | | | | 705/311 |
| 2016/0036460 A1 | 12/2016 | Sengupta et al. | | |
| 2016/0364608 A1* | 12/2016 | Sengupta | ............. | G06F 16/345 |
| 2019/0311301 A1* | 10/2019 | Pyati | .................... | G06F 16/901 |
| 2020/0074169 A1* | 3/2020 | Mukhopadhyay | .......................... | |
| | | | | G06K 9/00449 |

OTHER PUBLICATIONS

Lerman, Kristina et al; "Using the Structure of Web Sites for Automatic Segmentation of Tables" SIGMOD 2004 Proceedings of the ACM SIGMOD International Conference on Management Data, France, Jun. 13-18, 2004; New York, NY:ACM, US, Jun. 13, 2004, pp. 119-130.

International Search Report and Written Opinion for International Application No. PCT/US2019/062541, dated Mar. 12, 2020, 16 pages.

Notice of Allowance for related U.S. Appl. No. 16/147,018, dated Aug. 26, 2020, 8 pages.

* cited by examiner $$\text{Loss}(x) = \mathbb{E}_{\mathbf{p}_i,\mathbf{p}_j \sim U[0,1]^2} \left[ \mathbf{1}\{y_i = y_j\} \cdot \|f_\theta(x_{\mathbf{p}_i}) - f_\theta(x_{\mathbf{p}_j})\|^2 \right.$$
$$\left. + \mathbf{1}\{y_i \neq y_j\} \cdot \exp\{-\frac{1}{2\sigma^2}\|f_\theta(x_{\mathbf{p}_i}) - f_\theta(x_{\mathbf{p}_j})\|^2\} \right]$$

*FIG. 5*

$$\mathcal{L}_e = -\frac{1}{|S|} \sum_{p,q \in S} w_{pq} \left[ 1_{\{y_p = y_q\}} \log(\sigma(p,q)) + 1_{\{y_p \neq y_q\}} \log(1 - \sigma(p,q)) \right]$$

FIG. 9

LAYOUT-AGNOSTIC COMPLEX DOCUMENT PROCESSING SYSTEM

BACKGROUND

The automated processing and understanding of content within a variety of types of documents or portions of documents, such as from forms or tables within documents, is a difficult problem with a strong-felt need for a solution. Although solutions do exist for analyzing documents having fixed, rigidly-defined layouts because it is trivial to write logic to identify known values in known locations, the automated handling of documents that have flexible and/or unknown layouts is not a solved problem.

BRIEF DESCRIPTION OF DRAWINGS

Various embodiments in accordance with the present disclosure will be described with reference to the drawings, in which:

FIG. 5 is a diagram illustrating an exemplary grouping loss function useful for training one or more machine learning models of a key-value differentiation unit according to some embodiments.

FIG. 9 is a diagram illustrating an exemplary loss function useful for training one or more machine learning models of an embedding generator according to some embodiments.

DETAILED DESCRIPTION

Figure 1:
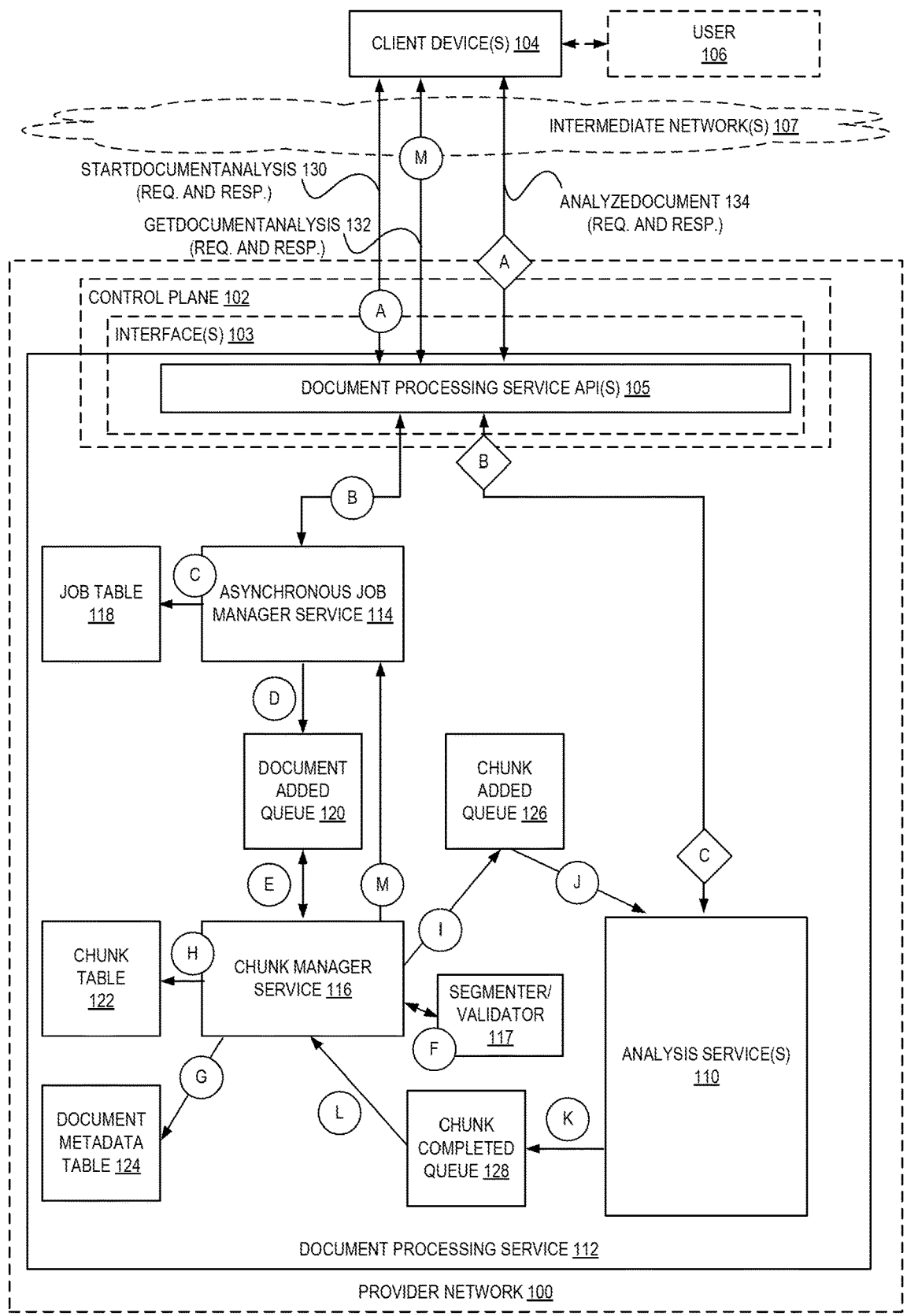
FIG. 1 is a diagram illustrating an architectural framework of a system for layout-agnostic complex document processing according to some embodiments.

Various embodiments of methods, apparatus, systems, and non-transitory computer-readable storage media for layout-agnostic complex document processing are described. According to some embodiments, a document processing service implemented with a variety of microservices can analyze and "understand" the content of digital documents at cloud-scale without needing an advance understanding of the type or layout of the document. The document processing service may implement a dual-path approach to perform the analysis in an "online" synchronous manner responsive to user requests or in an "offline" asynchronous manner, where single documents or batches of documents can be analyzed. The document processing service can detect and comprehend various segments of different types within a document, such as forms, receipts, invoices, tables, etc., and can determine what data is present within these segments and the inter-relationships amongst the data. For example, in some embodiments the document processing service can identify the existence of a form within a digital document, identify which portions of the form are "keys," which portions of the form are "values" of the keys, and which of the values correspond to which of the keys. Accordingly, the document processing service can provide the results of the analysis back to users and/or enable more complex processing to be performed upon this detected data.

In modern industry, techniques from the field of machine learning (ML) are being adapted in a variety of fields for a variety of purposes. For example, using ML to analyze images to detect the existence and locations of objects is one such application. Another application includes analyzing images (that carry a representation of a document) to identify what text is within the document. For example, to implement a document processing service, numerous types of ML models may be utilized to analyze digital documents seeking to, for example, identify where text is represented within an image representation of a document and identify what that text is.

However, performing such operations with documents carrying a representation of a form, receipt, invoice, or other type of "complex" document—especially when a ML model has not been trained to "understand" a particular format of the document—remains a difficult task. For example, identifying the various components in a document that contains a form is problematic. In some cases, a form schema that contains the various form keys (e.g., "first name", "last name", "address", etc.) is available, but the actual form layout may vary across different forms. In other cases, a form schema may not even exist. Although some optical character recognition (OCR) tools can successfully identify some of the words contained in documents, identifying and classifying these words in the context of forms (and other types of "segments" of a document) is not trivial due to various noises and nuisances, including outlier detections and ambiguity in classification—for example, the word "name" may appear multiple times. Similar issues exist for other types of documents, and these issues are magnified for documents including multiple segment types (e.g., a form, a paragraph of text, a receipt, a column of text, a table, an invoice, etc.).

Prior systems are not able to accommodate these types of documents and/or document segment types. For example, a previous approach to analyzing forms included attempting to extract entered form data by, for example, obtaining an image of a form (e.g., scanning a form) and trying to analyze it based on some defined layout (or "template") that is defined in advance. Thus, by using advance knowledge of where a particular field is, the system can look in that defined place to find the value—e.g., look in a box at a particular coordinate within a document for a "name." However, when the layout of the form to be analyzed changes, such systems break until the system is reconfigured with the details of the "new layout" in order to thereafter be able to process that form—for example, people have to update mappings, and the system needs to know which one of the mappings needs to be used for a particular form. This problem is further complicated in that there can be dozens of different layouts for a same form, new forms can be introduced all the time, etc., and thus this approach doesn't scale.

However, embodiments provide an automatic layout-free system that accommodates various types of documents and optionally including various document segment types, and embodiments no longer necessarily need to have explicit knowledge of a document (or segment, such as a form) in advance but can instead intelligently analyze the document to detect the type of document, document segments, and data within the document segments (e.g., where the keys and values are located in a form, without the use of a faulty template-matching approach).

FIG. 1 is a diagram illustrating an architectural framework of a system for layout-agnostic complex document processing according to some embodiments. The system includes a set of one or more document processing service application programming interface(s) 105, an asynchronous job manager service 114, a chunk manager service 116, and one or more analysis services 110, any of which may be implemented as software modules executed by one or multiple computing devices (e.g., server computing devices) at one location (e.g., within a rack or set of computing devices in a same room or building) or multiple locations (e.g., within multiple rooms or buildings at one or multiple geographic locations—potentially across numerous cities, states, countries, or continents). These elements of the system may rely upon a set of data structures (e.g., queues, database tables, flat files, etc.)—implemented within the system or provided by other components (e.g., other services)—such as the job table 118, document added queue 120, chunk table 122, document metadata table 124, chunk added queue 126, and/or chunk completed queue 128. However, these data structures may be consolidated (e.g., multiple ones of the structures can be implemented in a joint manner) or further expanded in other embodiments according to techniques known to those of skill in the art.

In some embodiments, this system is implemented as part of a document processing service 112 that itself may be implemented within a provider network 100. A provider network 100 provides users (e.g., user 106) with the ability to utilize one or more of a variety of types of computing-related resources such as compute resources (e.g., executing virtual machine (VM) instances and/or containers, executing batch jobs, executing code without provisioning servers), data/storage resources (e.g., object storage, block-level storage, data archival storage, databases and database tables, etc.), network-related resources (e.g., configuring virtual networks including groups of compute resources, content delivery networks (CDNs), Domain Name Service (DNS)), application resources (e.g., databases, application build/ deployment services), access policies or roles, identity policies or roles, machine images, routers and other data processing resources, etc. These and other computing resources may be provided to users as "services," such as a hardware virtualization service that can execute compute instances, a storage service that can store data objects, etc. The users 106 (or "customers") of provider networks 100 may utilize one or more user accounts that are associated with a customer account, though these terms may be used somewhat interchangeably depending upon the context of use. Users 106 may, via a client device 104 such as a personal computer (PC), laptop, mobile device, smart device, etc., interact with a provider network 100 across one or more intermediate networks 107 (e.g., the internet) via one or more interface(s) 103, such as through use of application programming interface (API) calls, via a console implemented as a website or application, etc. The interface(s) 103 may be part of, or serve as a front-end to, a control plane 102 of the provider network 100 that includes "backend" services supporting and enabling the services that may be more directly offered to customers.

To provide these and other computing resource services, provider networks 100 often rely upon virtualization techniques. For example, virtualization technologies may be used to provide users the ability to control or utilize compute instances (e.g., a VM using a guest operating system (O/S) that operates using a hypervisor that may or may not further operate on top of an underlying host O/S, a container that may or may not operate in a VM, an instance that can execute on "bare metal" hardware without an underlying hypervisor), where one or multiple compute instances can be implemented using a single electronic device. Thus, a user may directly utilize a compute instance hosted by the provider network to perform a variety of computing tasks, or may indirectly utilize a compute instance by submitting code to be executed by the provider network, which in turn utilizes a compute instance to execute the code (typically without the user having any control of or knowledge of the underlying compute instance(s) involved).

A user 106 via a client device 104 (or a client device 104 acting under the configuration of, or the benefit of, a user 106) may interact with the document processing service 112 to analyze electronic (or "digital") documents. An electronic document may be a digital file storing a representation of a document, such as a form or receipt. For example, an electronic document may be a Portable Document Format (PDF) file, a word processing document such as a Word™ document or Open Document Format (ODF) file, an image including a representation of a document (e.g., a JPG, GIF, PNG)—which may have been captured by an optical sensor (or camera) of the client device 104, etc. Each electronic document may include one or multiple "pages" of content, and each page may include one or multiple document "segments" described above, where each may be thought of as a portion of a document including text arranged according to some common theme or arrangement.

The term "text" (or the like) may be used to refer to alphanumeric data—e.g., alphabetic and/or numeric characters, which may include Latin letters, Arabic digits, punctuation marks, symbols, characters from other character sets, etc. As one example, text may include Unicode characters (e.g., currently 137,439 characters covering 146 modern and historic scripts, as well as multiple symbol sets and emoji). Thus, the term text is to be understood broadly and is not meant to be limited to only "letters" unless otherwise indicated by the context of use.

To analyze a document, a user 106 may utilize one or more API calls to the document processing service API(s) 105, which may be carried by HyperText Transfer Protocol (HTTP) request messages destined to an endpoint associated with the provider network 100 or document processing service API(s) 105, though in other embodiments the API calls may be made via function/procedure calls to a library that implements the document processing service 112, in which case the document processing service 112 may optionally be resident on the client device 104 (not illustrated) and thus, locally invoked by client code. For example, a first type of API call—here represented as using a method of "startDocumentAnalysis" 130—may be sent as a request at circle (A) to indicate to the document processing service 112 that the user 106 desires for asynchronous analysis to be performed for one or multiple documents. In such an asynchronous mode of operation, the document processing service API(s) 105 may respond with a "unique" (at least within a particular period of time in some particular context) job identifier (ID) in a response (to the request) that can later be used to poll for the job's status and/or obtain eventual results. (This job ID can be obtained, for example, by the asynchronous job manager service 114 as described below, which in some embodiments is the only component of the asynchronous path that is on a request critical path.)

By way of example, the startDocumentAnalysis 130 request may include, for example, a "Document" attribute including a number of bytes carrying the document itself, or a set of identifiers of a location of a document (e.g., at/in a storage service). The startDocumentAnalysis 130 request may also include a set of feature types indicating which types of features the user seeks to extract from the document (e.g., all tables, all forms (or, key-value pairs), all types of features, etc.), a request token (for idempotency, which could be an ASCII string of some size—e.g., between 1 and 64 characters in length), a job tag (for tracking purposes, which also could be an ASCII string of some size—e.g., between 1 and 64 characters in length), an identifier of a notification channel (e.g., a provider network resource name) that can be used to send a job completion event, etc. Similarly, the response to a startDocumentAnalysis 130 request may include a job identifier as indicated above that can be used by the user to track the status of the job and/or obtain results of the job.

In contrast to this asynchronous processing configuration, as shown by diamond (A), another type of API call may be issued—here represented as using a method of "analyzeDocument" 134—to the document processing service API(s) 105 (e.g., carried by an HTTP request message) indicating that the user desires for synchronous analysis to be performed for one or more documents, and thus, the results of the process to be returned in a synchronous manner (e.g., within or otherwise identified by an analyzeDocument response message 134, which may be carried by an HTTP response message sent in response to an analyzeDocument HTTP request).

By way of example, the analyzeDocument 134 call may include, for example, a "Document" attribute including a number of bytes carrying the document itself, or a set of identifiers of a location of a document (e.g., at/in a storage service). The analyzeDocument 134 call may also include a set of feature types indicating which types of features the user seeks to extract from the document, e.g., all tables, all forms (or, key-value pairs), all types of features, etc. Similarly, the response to the analyzeDocument call may identify results in a variety of formats—e.g., a list of blocks identified within the document, a unique identifier of each block, a relationship between the block and other blocks (e.g., child or parent), a block type identifying a type of the block (e.g., block, key, page, value, line, word, etc.), an identifier of which page the block was found on, what entity type is inferred for the block, document metadata (e.g., number of pages, size, format, etc.), or other information.

In some embodiments, the document processing service API(s) 105 may be responsible for handling these incoming requests from users with as low latency as possible, and may also handle general administrative type tasks on behalf of the document processing service 112, including but not limited to metering, throttling, whitelisting, access control, and/or other functionalities known to those of skill in the art.

Either type of request—e.g., the startDocumentAnalysis request 130 or analyzeDocument request 134—may explicitly carry the document(s) to be analyzed or may carry an identifier that can be used to obtain the document(s). For example, a request may include one or more identifiers of one or more storage locations (e.g., a URI, a storage bucket/folder or path name) where one document or multiple documents are stored. Thereafter, the document processing service 112 may use the identifier(s) to obtain the document(s)—as one example, by sending a request to download one or more documents based on the identifier(s) and receiving one or more responses carrying the one or more documents.

Regarding the synchronous path, at diamond (B) the document processing service API(s) 105 may send a request (and/or the document) to the analysis service(s) 110 for processing, and the results of the processing can be passed back at diamond (C) to the document processing service API(s) 105, and ultimately passed back to the client device 104 in a synchronous manner, e.g., as a response to the analyzeDocument 134 request from diamond (A).

Turning to the asynchronous path, at circle (B) the document processing service API(s) 105 can provide the request to an asynchronous job manager service 114. The asynchronous job manager service 114 may implement the general managerial logic relating to managing asynchronous jobs and their associated state. These responsibilities may include one or more of: creating an authoritative job identifier for the job (e.g., which may be passed back to the client in a startDocumentAnalysis response 130 as described above), persisting the initial job details (e.g., the job ID, what user is involved, what is the time of the request, what document(s) are to be processed, etc.) into the job table 118 at circle (C), queuing a message/entry onto the "DocumentAdded" queue 120 (e.g., each entry indicating a job ID and an identifier of the document such as a URI/URL) indicating that a new job has been created at circle (D), monitoring and maintaining the state information for a customer job (e.g., via the job table 118), providing this state information to the document processing service 112 when requested, and/or other job-related tasks. The job table 118, in some embodiments, represents the data that is needed to answer user API calls about the status of their asynchronous processing jobs.

The Document Added queue 120 may serve to buffer incoming asynchronous jobs (e.g., one document per job). This queue 120 may assist in implementing a fair share scheduling that gives priority to smaller documents.

The chunk manager service 116 (e.g., a worker thread of the chunk manager service 116) at circle (E) may detect that a document has been added to the DocumentAdded queue 120 (e.g., via polling the queue, via subscribing to events or notifications issued by the queue, etc.). With each document, the chunk manager service 116 may perform a query/lookup at circle (G) with a document metadata table 124 to see if the document has already been validated (e.g., during a previous round of processing, where the analysis of the document may have been paused or halted)—if so, the chunk manager service 116 need not again download the document, validate the document, examine the number of pages of the document, etc. If not, the chunk manager service 116 may detect and divide multipage documents into one or more "chunks" via the segmenter/validator 117 (F), where each chunk can fit into a single inference batch. In some embodiments, a chunk is made up of one or more document pages—for example, twenty pages per chunk. The system may process chunks in parallel in a distributed manner. To implement this process, the chunk manager service 116 may be responsible to perform one or more of the following: splitting the document into chunks (e.g., via segmenter/validator 117) and storing/uploading those chunks at/to a storage location (e.g., of a storage service of the provider network 100), inserting records in a chunk added queue 126 at circle (I) that correspond to the segmented chunks, extracting available metadata about the document file objects (such as text, tables, etc., which can be provided later to the analysis service 110 components to improve model accuracy, for example) and storing this information in a document metadata table 124 at circle (G), maintaining persistent records of the processing status of each chunk in the chunk table 122 (which stores metadata about the status and result of each chunk that is or has recently been processed) at circle (H), determining when all chunks of a document have been processed by the analysis service(s) 110 (via monitoring of a chunk completed queue 128 at circle (L), discussed later herein), aggregating a collection of chunk results into a single overall result for the document, notifying the asynchronous job manager service 114 at circle (M) once processing has been completed for a document, and/or other processing tasks. The asynchronous job manager service 114 may then update its job table 118 as necessary (e.g., to indicate a completion status of the job, etc.). Notably, one or multiple instances of the analysis service(s) 110 may exist, which may identify chunks added to the chunk added queue 126 (e.g., via polling the chunk added queue 126, by subscribing to events of the chunk added queue 126, etc.) and perform analysis on a single chunk at a time, or on multiple chunks in parallel.

The chunk added queue 126 may optionally include a set of queues which represent different chunk priorities—e.g., high priority, lower priority (e.g., for larger documents), etc. The chunk added queue 126 may act as a buffer between the document segmentation process and the actual analysis that allows for chunks to be processed in parallel as well as optionally supporting different chunk priorities. In some embodiments, this queue 126 further assists in implementing a fair share scheduler that could optionally favor specific chunks inside a document.

The chunk completed queue 128, upon the completion of analysis for a chunk, is updated with an entry that can be is read by the chunk manager service 116 and used to update the status of the job as a whole as well as create the final (completed) result.

After submitting the processing job via the startDocumentAnalysis 130 request (and the receipt, by the client device 104, of a job ID) the client device 104 may "poll" the document processing service API(s) 105 to determine the status of the job (e.g., complete, still processing, error, etc.), and obtain the results of the job when it is complete. These tasks may be performed by a single API call—getDocumentAnalysis 132 (e.g., including a job ID, seeking the job status and optionally the analyzed document output, if the job is finished)—or separated into distinct API calls (e.g., getJobStatus and getDocumentAnalysis), for example. Upon receipt of such a call, the document processing service API(s) 105 may pass the request onto the asynchronous job manager service 114, which can consult the job table 118 (or another results store, when output from a completed job is stored separately) to provide the necessary job status and/or job output back to the document processing service API(s) 105 and thus back to the requesting client device(s) 104. A variety of types of status values may be used according to the implementation, such as any or all of an invalid document type was provided, the provided document was password protected, the identified file is unable to be obtained, the size of the file is larger than a threshold amount, etc.

In some embodiments, an additional responsibility of the chunk manager service 116 is to ensure that a small number of very large jobs do not consume all available resources and thus starve smaller jobs where faster processing would be expected by users. For example, if there are ten chunk manager service 116 instances having some number (e.g., 10) of threads each, and a user submits several hundred or thousand large documents to be processed, it could be the case that one-hundred percent of some resource could be consumed for a long period of time and block all other jobs until either new hardware is allocated or the original jobs complete. Thus, in some embodiments the chunk manager service 116 may analyze the document, and if there is not enough idle capacity available for the regular set of analysis operations, it may return the document to the queue until a later point in time. In this case, the chunk manager service 116 may cache the size details (in the document metadata table 124) so that the next time that document is processed it doesn't need to be re-downloaded and/or analyzed to determine its size. Some embodiments may also use file-based heuristics to determine a document's "likely" size—for instance, the number of bytes of a document provide a useful indication of an estimated page count.

In some embodiments, the chunk manager service 116 will segment and "validate" the documents as introduced above (e.g., via segmenter/validator 117). For security reasons, processes that actually open a document (for validating or segmenting) may need to be performed in a "sandbox" that is partitioned from the internet to avoid inadvertently participating in an attack or other malfeasance. Thus, the a segmenter/validator 117 component of the chunk manager service 116 may be a separate, deployable unit that may co-reside or otherwise be accessible to the chunk manager service 116 (and optionally, the analysis service(s) 110). For example, in some embodiments the asynchronous flow utilizes both the segmenter and validator components when processing the full document, whereas the synchronous flow may include directly providing the document(s) directly to the analysis service(s) 110 where they may be validated (as being proper documents, within the analysis service(s) 110 or via use of the segmenter/validator 117) but in many embodiments, not segmented (as the synchronous path may be constrained to single-page documents, for example).

Accordingly, in some embodiments the segmenter/validator 117 component may be a "sidecar" service, and/or may have two different APIs exposed—one that validates and returns metadata such as page count, etc., and another that performs the actual document segmentation, which can help support fair scheduling in that large files can be detected and requeued in moments of increased utilization.

Notably, these various service components can be auto-scaled (to include more or fewer instances of each service) based on resource consumption to allow for ease of scaling up or down and ensure satisfactory performance of the entire system.

Embodiments may further implement protections to defend against bugs that might trigger infinite work for the asynchronous system, e.g., by implementing maximum retry counts, dead letter queues, etc., to combat this situation. Thus, once a chunk has failed processing more than some threshold number of times, it can be added to a "dead letter queue" which results in an alarm being generated.

Figure 2:
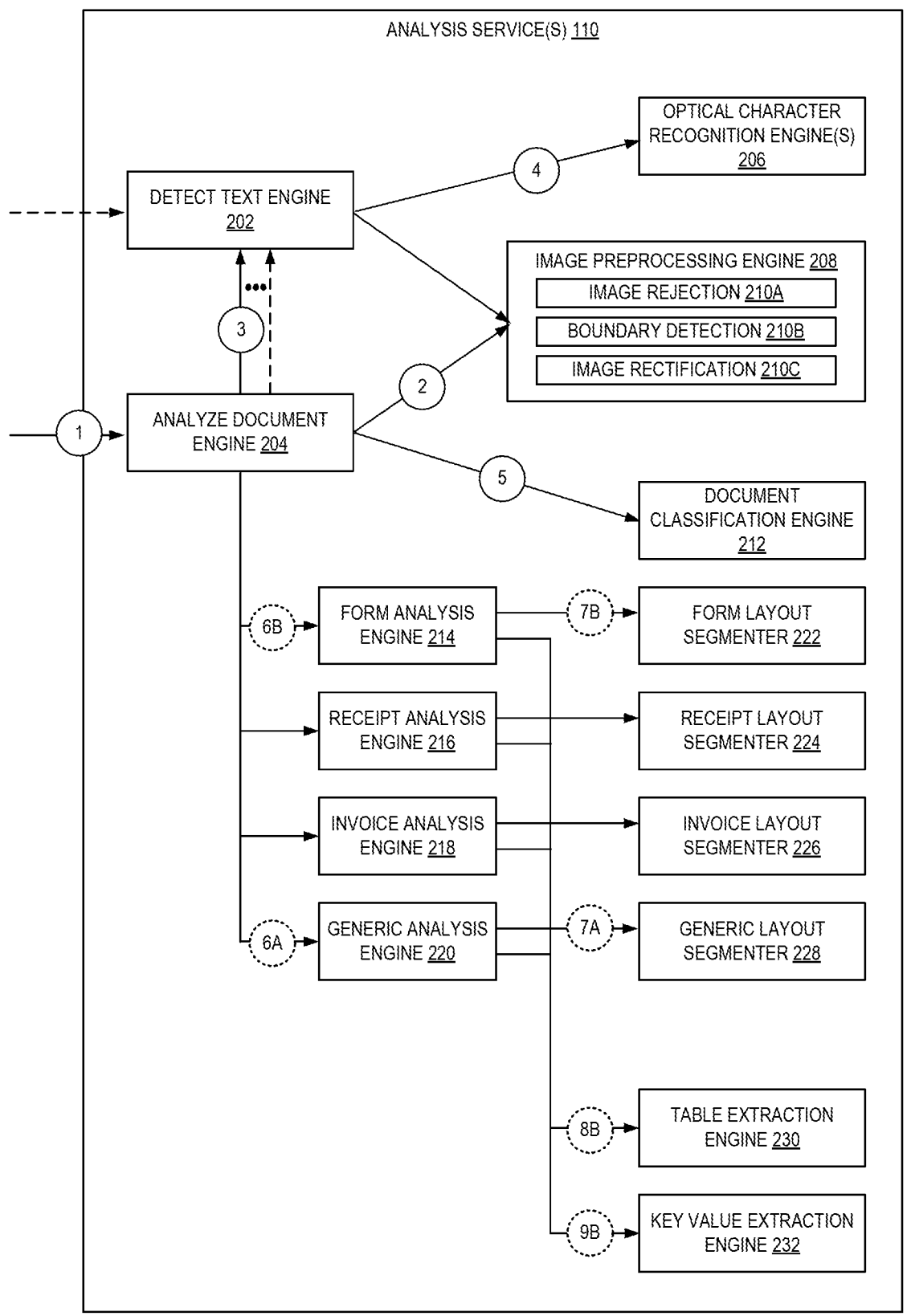
FIG. 2 is a diagram illustrating an exemplary architecture of an analysis service for layout-agnostic complex document processing according to some embodiments.

For detail regarding how the actual processing of a document is performed by the analysis service(s) 110, we turn to FIG. 2, which is a diagram illustrating an exemplary architecture of an analysis service 110 for layout-agnostic complex document processing according to some embodiments. This exemplary architecture includes a detect text engine 202, an optical character recognition (OCR) engine 206, an analyze document engine 204, an image preprocessing engine 208, a document classification engine 212, form analysis engine 214, receipt analysis engine 216, invoice analysis engine 218, generic analysis engine 220, and other supporting segmenters 222-228 and engines 230-232. As indicated above, the analysis service 110 may be implemented using software executed by one or multiple computing devices, possibly in a distributed manner, and thus these components may similarly be implemented as software, each executed by one or multiple computing devices.

At circle (1), the document image is passed to the main analyze document engine 204. At circle (2), the data of the image (carrying the representation of the document)—e.g., the bytes that make up the image—are passed to the document classification engine 212, where the image is validated to ensure that a document does exist within the image (by image rejection 210A module, which can comprise an image library that can ensure the image is a proper image of a document, and/or a machine learning (ML) model trained to identify document elements such as text, lines, etc., such that a picture of a dog, for example, would be rejected as improper). The image preprocessing engine 208 may also rectify the image with image rectification 210C module (e.g., by rotating, skewing, etc., the image to align it to have 90 degree edges, etc.) and segment the image (via boundary detection 210B module) into distinct elements—for example, into two receipts scanned on a single page. The boundary detection 210B module may comprise an object detection ML model trained to identify particular elements of a document, e.g., a table, a form, a paragraph of text, etc., with bounding boxes that encapsulate these elements. The result of this call to the image preprocessing engine 208, in some embodiments, is an array of image bytes and associated bounding boxes of elements, where an element may or may not correspond to a segment.

For each such element identified by the image preprocessing engine 208, the corresponding bytes of that element of the image are passed to the detect text engine 202 at circle (3), which can identify the text within the element via use of one or more OCR engines 206 known to those of skill in the art. In some embodiments, the calls made at circle (3) may be done at least partially in parallel. The one or more OCR engines 206 can detect and recognize text within an image, such as document keys, captions, numbers, product names, etc., and may support text in most Latin scripts and numbers embedded in a large variety of layouts, fonts and styles, and overlaid on background objects at various orientations. The OCR engine(s) 206 may include a first engine that identifies bounding boxes specific to the text or portions of the text (such as words), and a second engine that uses these bounding boxes to identify the particular text within the bounding boxes. As a result, the OCR engines 206 may generate a list of "words" found in the document in a 3-tuple identifying where the word was located, what the word is, and a confidence score: [Bounding Box, Text Value, Confidence Score].

At circle (5), the segmented image resulting from the image preprocessing engine 208 may be passed to the document classification engine 212, which can identify what "segment" the element is, or what one or multiple segments are within an element. The document classification engine 212 may be a ML model (such as a convolutional neural network (CNN) or other deep network) trained to identify different types of segments, such as paragraphs, forms, receipts, invoices, etc. The document classification engine 212 may thus output identifiers of what portions of the element include what type of segment—for the sake of this example, we assume that a first segment is identified as being of type "paragraph" while a second segment is identified as being of type "form."

The paragraph segment is passed to the generic analysis engine 220 at circle (6A), where it may further segment the segment into sub-segments—e.g., paragraph, line, etc. at circle (7A) via use of a generic layout segmenter 228, optionally resulting in an array of Semantic Region objects [Region Label, Bounding Box, Id]. Beneficially, this call can be parallelizable as the result may not be needed until a final consolidation of the result.

Similarly, the form segment is passed to the form analysis engine 214 where it may further segment the segment into sub-segments specific to forms (e.g., form title, figure, etc.) at circle (7B) by form layout segmenter 222, again optionally resulting in an array of Semantic Region objects [Region Label, Bounding Box, Id]. Likewise, this call can also be parallelizable as the result may not be needed until a final consolidation of the result.

For each of these semantic region objects representing a table, a call can be made to a table extraction engine 230 at circle (8B) that is trained to identify components of tables—e.g., table headings, rows, etc.

Similarly, the form segment may be passed to a key value extraction engine 232 at circle (9B) which, as described in additional detail herein, can analyze the form to identify keys in the form, values in the form, and which keys correspond to which values.

Although not described in this example, for other segments similar components can be utilized. For example, for a detected invoice segment, the segment can be passed to an invoice analysis engine 218, which may make use of an invoice layout segmenter 226 that can identify semantic region objects as described above. As invoices have fairly standard layouts across industries and even across the world—where there are line items having a description of the item, a number of items, a price per item, etc., the invoice layout segmenter 226 may comprise one or more neural networks trained to look at such an invoice and determine which portions are headings, which are line items, verify the invoice amounts (e.g., total items, total cost, etc.), etc., and generate data explaining what the invoice represents.

With the resulting information and corresponding location information (e.g., bounding boxes) of the segments, some embodiments perform additional post-processing to consolidate the information from the potentially multiple inference pipelines into a cohesive "hierarchical" result. For example, keys and values may include multiple lines or words, and thus post-processing can be implemented to identify bounding box overlaps (e.g., the existence of a bounding box within another bounding box), which can thus be represented in a hierarchical manner (e.g., as a parent-child relationship). By way of example, a document may include several top-level entities (e.g., a form, a receipt, a block of text) and each of these entities may have one or more entities (e.g., for a form, one or more key-value pairs) and perhaps so on at further levels (e.g., for a key-value pair, a key and a value; and likewise, for a value, one or multiple lines of text), etc.

Figure 3:
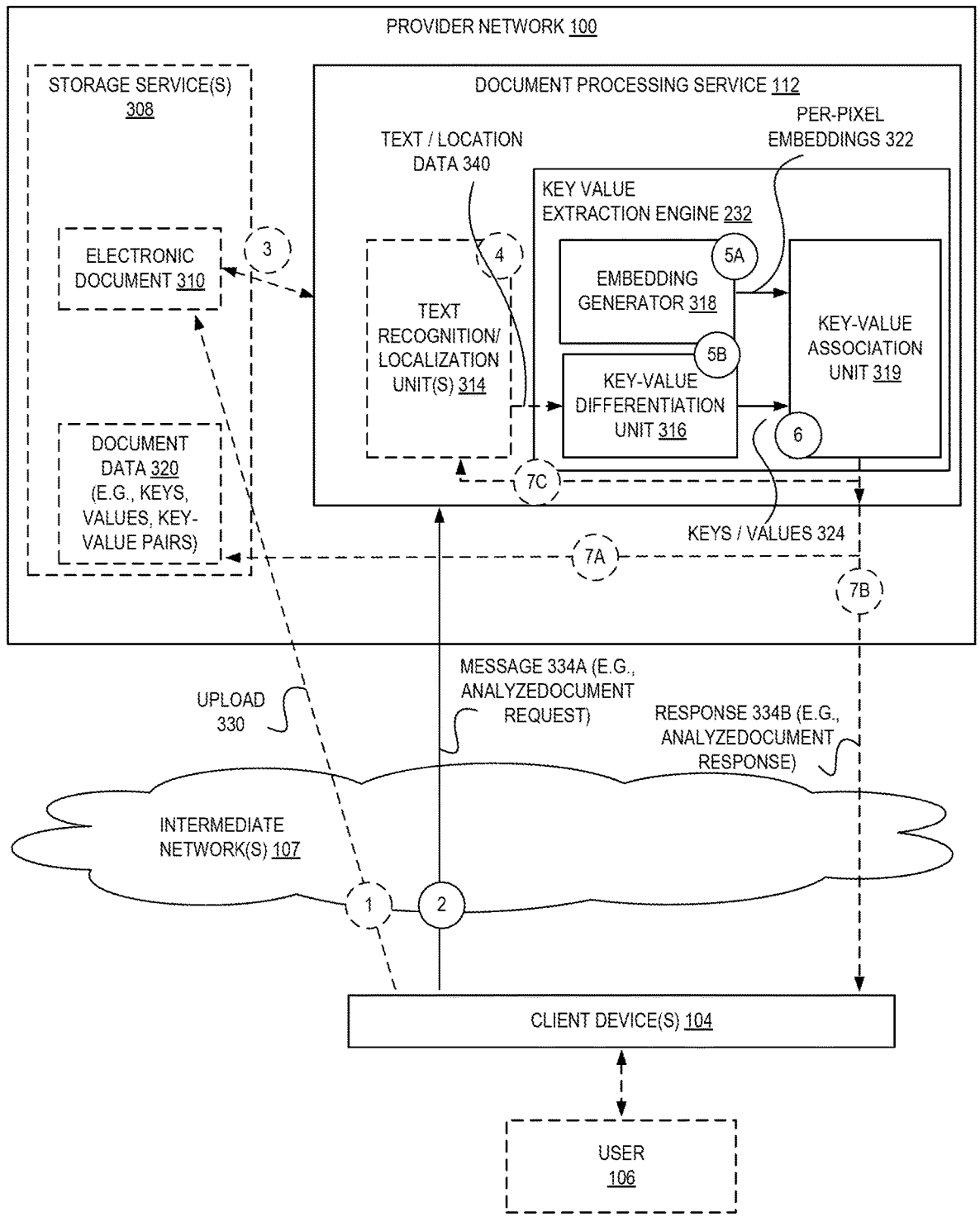
FIG. 3 is a diagram illustrating an environment including a document processing service of a provider network for automated form understanding via layout-agnostic identification of keys and corresponding values according to some embodiments.

For further detail of an exemplary implementation and use of a key value extraction engine 232, FIG. 3 is a diagram illustrating an environment including a document processing service of a provider network for automated form understanding via layout-agnostic identification of keys and corresponding values according to some embodiments.

As indicated above, to utilize the document processing service 112, a user 106 may utilize a client device 104 to obtain (e.g., create, download, capture via a camera/optical sensor, etc.) an electronic document 310. The electronic document 310 may be a digital file storing a representation of a document such as a form. For example, the electronic document 310 may be a Portable Document Format (PDF) file, a word processing document such as a Word™ document or Open Document Format (ODF) file, an image including a representation of a document (e.g., a JPG, GIF, PNG), etc.

Optionally, the user 106 may upload 330 the electronic document 310 (e.g., a digital image) to a location that is distinct from the document processing service 112 at circle (1). For example, the user 106 may cause the electronic device 104 to send the electronic document 310 to be stored at a location of a storage service 308 within (or alternatively, outside of) the provider network 100. The storage service 308 may provide, in a non-illustrated response message, an identifier of the electronic document 310 (e.g., a Uniform Resource Locator (URL) for the file, a unique identifier of the file within the context of the storage service 308 or provider network 100, a name of a folder (or storage "bucket" or group) that includes the file, etc.

At circle (2), the user 106 may utilize a client device 104 to cause it to send a processing request 334A to the document processing service 112. The processing request 334A may indicate the user's desire for the document processing service 112 to process a particular electronic document 310 (or group of electronic documents) in some manner.

For example, the processing request 334A may indicate that text of a form represented within the electronic document(s) 310 is to be identified, and that text "values" corresponding to text "keys" within the form are to be identified and paired, stored, and/or processed in some manner. As one example, an electronic document 310 may comprise an image file that was captured by an optical sensor of a scanner device or a user's mobile device, where the image file is a picture of a form such as a government-issued form document (e.g., a W2 form, a tax return form, etc.), a form provided by a company (e.g., a product order form, an employment application, etc.), or other type of form. Thus, the processing request 334A may indicate a request to identify data values entered within the form—e.g., a number (the value) of years of experience (the key) entered into an employment application—and store those values (e.g., within a database, which may have columns/keys corresponding to form keys), process those values (e.g., using a special purpose script, application, or set of rules), etc.

The processing request 334A may include (or "carry") the electronic document 310 or may include an identifier of an electronic document 310 (e.g., a URL). In a use-case where the processing request 334A includes the electronic document 310, the document processing service 112 may optionally at circle (3) store the electronic document 310 via a storage service 208. In a use-case where the processing request 334A identifies the electronic document 310, the document processing service 112 may obtain the electronic document 310 at circle (3) based on the identifier (e.g., by sending a HyperText Transfer Protocol (HTTP) GET request destined to a provided URL).

To process the electronic document 310, optionally a set of pre-processing operations may be performed—e.g., verify that a page/form is present in the image, determine whether the image needs to be rotated, rectify the page, clean up noise, adjust coloring, contrast, or the like, determine if the image is of sufficient quality (in terms of resolution, occlusions, contrast), etc. This set of preprocessing operations may be performed by the image preprocessing engine 208 of FIG. 2, for example.

At circle (4) the text recognition/localization unit 314 may operate upon the electronic document 310 to identify locations of text within the document. The text recognition/localization unit 314 may comprise, for example, an object detection ML model trained to identify locations of characters, words, lines of text, paragraphs, etc., as is known to those of skill in the art. The text recognition/localization unit 314 can identify the locations of the text in the form of bounding boxes, coordinates, etc.

Optionally, the text recognition/localization unit 314 can also identify the text itself within the electronic document 310. This identification may include using the identified locations of text and may include performing an optical character recognition (OCR) process upon these locations. Thus, this OCR procedure may be run against a subset of the document (in the form of the identified locations) and not against the entire document itself, which can be faster, more resource efficient, and eliminate or reduce the analysis of other non-necessary text that may be within the document (e.g., instructions, footnotes). In some embodiments, such text identification occurs before the operations described regarding circles (5A), (5B), and/or (6), though in other embodiments it occurs in parallel with ones of these operations, or even after these operations have completed. For example, after key regions and associated value regions have been identified (e.g., after circle (6)), key-value association unit 319 may trigger (directly or indirectly) the text recognition/localization unit 314 to identify what the text is within the key regions and value regions. Alternatively, the text recognition/localization unit 314 may simply perform an OCR process that may not include a separate location detection phase.

However, in some embodiments the text recognition/localization unit 314 may utilize different techniques to achieve the same result. For example, the electronic document 310 may potentially be a PDF file already including the text within the document (instead of just carrying a "flat" image alone), and the text recognition/localization unit 314 may identify this text and also identify the locations of that text (e.g., from the PDF metadata, from its own object detection or matching model, etc.).

At this stage, text has been detected as being represented within the electronic document 310, and locations of the text have similarly been detected. However, when the electronic document 310 is a form—and especially a "new" form that has not yet been observed—there is no knowledge of which text elements are "keys" of the form and which are "values." As is known, a form may include one or more keys such as "first name," "last name," "full name," "address," "amount," "value," etc., and the completed form may have values for one or more (or possibly all) of these keys—e.g., "Dominic," "200.50," "Samuel," etc. To be able to act upon this data in a programmatic and intelligent way, it is imperative to determine which text elements are keys and which are values.

The detected text elements and/or location data 340 are provided to the key-value differentiation unit 316, which can operate on portions (or all) of the electronic document 310 at circle (5B) with this provided information to determine which of the text elements are keys and which of the text elements are values. The detected text elements and location data 340 may be provided by sending this data (e.g., within files, or within a "string" or "blob" of text) directly to the key-value differentiation unit 316, by storing this data in a known storage location (e.g., by storage service 208) that the key-value differentiation unit 316 is configured to look in, by sending an identifier of such a location to the key-value differentiation unit 316, etc. Similarly, the electronic document 310 itself may be passed according to similar techniques together with or separate from the detected text elements and location data 340.

The key-value differentiation unit 316 operates by generating a feature vector for each text element (e.g., word or phrase) using one or more specially-trained machine learning (ML) models. The feature vectors created for each text element of a particular electronic document 310 are clustered into (at least) two different groups. The key-value differentiation unit 316 can then use labeled feature vectors (indicating whether corresponding text elements are keys or values) to determine which cluster includes feature vectors corresponding to "key" text elements and/or "value" text elements. The labeled feature vectors may have been provided/used during the training of the ML model(s), could be "actual" keys and values previously determined by the key-value differentiation unit 316 (and confirmed as being accurately detected), or a combination of both.

For example, according to some embodiments, a key-value differentiation unit 316 can identify which words or phrases of an electronic document are key fields and which words or phrases are key values. The key-value differentiation unit generates feature vectors for detected text elements from a document using a ML model that was trained to cause feature vectors for key fields to be separated from key values, feature vectors for key fields to be close to those of other key fields, and feature vectors for values to be close to those of other values. The feature vectors are clustered into two clusters. For values of each cluster, neighbors (e.g., nearest neighbors) can be identified from a labeled set of feature vectors, and based on the labels of the neighbors from each cluster, the identity of each cluster is determined.

When the text elements that are keys and/or the text elements that are values (or "keys/values 142") are determined, the keys/values 142 may be provided to the key-value association unit 319 and processed at circle (6) as described above. Additionally, at circle (5A) the embedding generator 318 may similarly operate on the electronic document 310 to generate per-pixel embeddings as described above, which are also provided to the key-value association unit 319 and processed at circle (6) as described above.

At this point, the key-value association unit 319 generates an output identifying which keys are associated with which values. This data may be stored via one or more storage services 208 as document data 320 at optional circle (7A). As one example, a representation of the keys and values may be generated (e.g., in JSON or eXtensible Markup Language (XML) format, as a string or blob of text, etc.) and stored as a file or as a database entry (or set of entries).

The output may be of a variety of formats. For example, for a value, the output may be a text string or a number, an indicator (e.g., CHECKED/UNCHECKED, TRUE/FALSE, etc.) indicating whether a checkbox (or other user interface input element) is marked, an image crop (e.g., a signature field), etc.

Additionally, or alternatively, at optional circle (7B) the data may be provided to an external (to the provider network 100) destination such as a client device 104 of the user 106, possibly within a processing response message 234, which may or may not be responsive to the processing request 334A. For example, the processing response message 234 may be sent as part of a session of communication where the user 106 utilizes a client device 104 to interact with the document processing service 112 via a web application (and thus, via a web endpoint interface 103) or another application.

As another example, in some cases the actual text may not have been yet identified (e.g., such as when the text recognition/localization unit(s) 314 have detected regions/locations including the text, but not the actual text itself), and thus at circle (7C) the key-value association unit 319 can cause the text recognition/localization unit(s) 314 to identify the actual text of the keys and values. For example, the key-value association unit 319 may send a request to the text recognition/localization unit(s) 314 that includes (or identifies) the particular regions of interest to be analyzed for text recognition. The resulting text could be returned to the key-value association unit 319, stored as document data 320, sent back within processing response 334B, etc., depending on the embodiment.

Although these exemplary functions and units 314/316/319 are described as being utilized in a serial or sequential manner, in various embodiments these functions may be implemented in other ways known to those of skill in the art with the benefit of this disclosure. For example, in some embodiments the key-value association unit 319 may operate partially or completely in parallel with other processing units—e.g., the key-value differentiation unit 316. In other embodiments, the key-value association unit 319 and key-value differentiation unit 316 may be implemented as a combined unit and possibly benefit from the existence of common processing tasks needed by each thus needing to only be performed once. Thus, many variations of these techniques and implementations exist which are covered by various embodiments.

Figure 4:
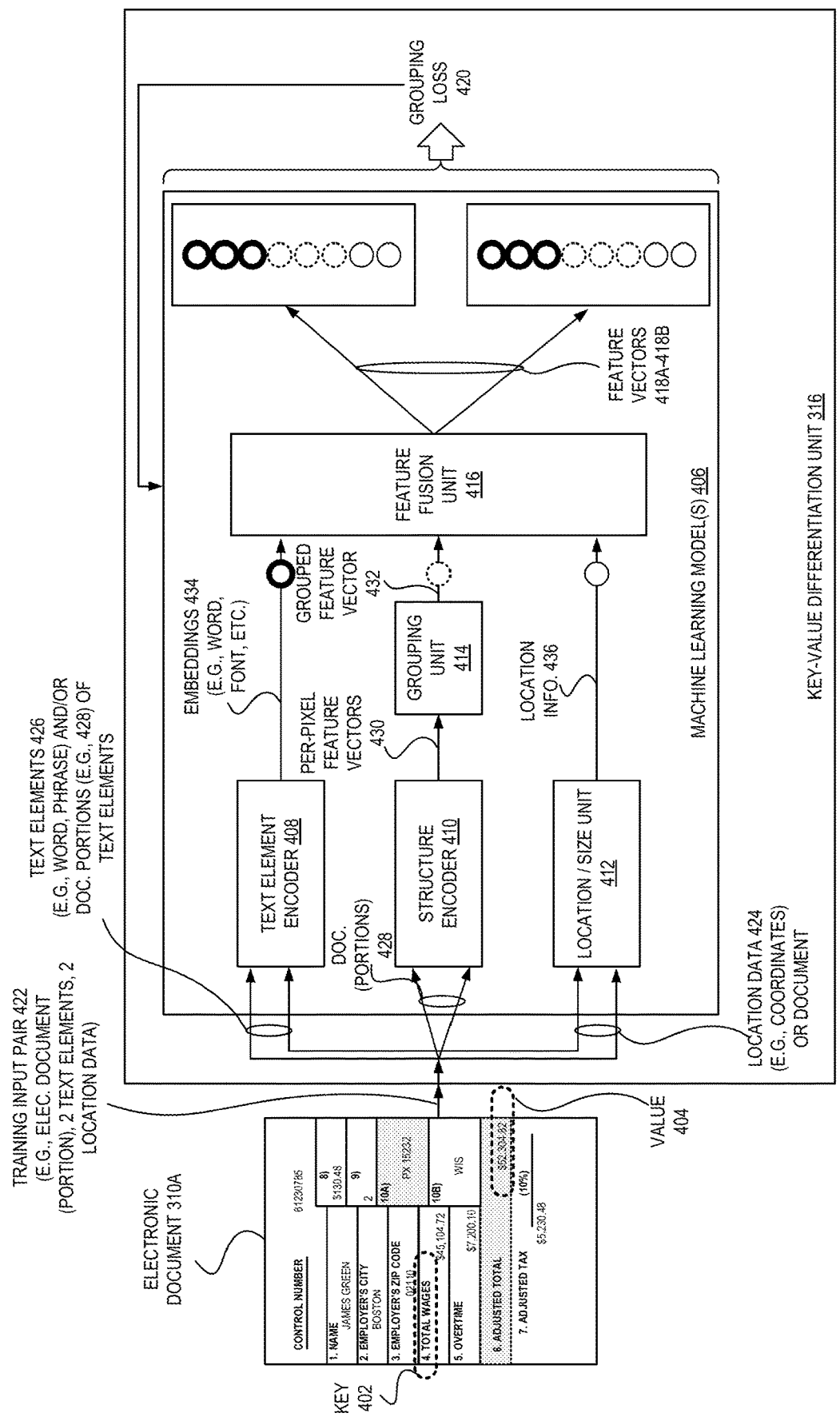
FIG. 4 is a diagram illustrating an example of training of one or more machine learning models of a key-value differentiation unit according to some embodiments.

For further detail regarding how the key-value differentiation unit 316 can operate to differentiate between text elements that are keys and text elements that are values, FIG. 4 is a diagram illustrating an example of training of one or more machine learning models of a key-value differentiation unit according to some embodiments.

In this figure, an example electronic document 310A is shown that includes multiple keys and multiple values. For example, a key 402 is shown as "4. TOTAL WAGES" while a value 404 is shown as "$52,304.82". This electronic document 310A, and likely many other electronic documents (e.g., 310B-310Z) may be used to train one or more machine learning models 406 to generate feature vectors 418 that are "close" together for two keys or for two values, but which are "far apart" for a key and value, allowing for keys and values to be programmatically distinguished.

As indicated, a large amount of training data in the form of annotated electronic documents 310A-310Z may be obtained or generated. Each annotated electronic document 310 may include a set of annotations—e.g., one or more of: an identification of what areas of the document include keys or values (e.g., bounding boxes), an identification of what text elements are present in the document (e.g., string values), an identification of which of the text elements are keys or values, etc. In some embodiments, the machine learning model(s) 406 may be trained using synthetic documents, semi-synthetic documents (where the keys and/or layouts are real, though the values are not), or annotated real documents.

In some embodiments, the machine learning model(s) 406 are trained using an iterative process, where each iteration utilizes using a pair of text elements—e.g., a training input pair 422. The training input pair 422 may include a key and another key, a key and a value, or a value and another value. The training input pair 422 may include identifiers (e.g., coordinates, bounding box information, etc.) of the corresponding locations of the document—or the actual data making up those locations—that include the text element, the text of the text element, a label of whether the text element is a key or a value, etc.

The one or more machine learning model(s) 406 may comprise implement different branches of processing that may be executed in parallel, in series, or combinations thereof.

A first branch of the processing is performed by a text element encoder 408. The text element encoder 408 in some embodiments operates upon the pair 426 of the text elements to generate a word embedding 434 for each of the text elements (e.g., each word or phrase). Thus, the text element encoder 408 may operate on a word or phrase basis and encode the semantic meaning of the word (e.g., an embedding for "first" may be relatively close to the embedding for "name" but will be far away from the embedding for "0.20").

A word embedding is commonly used to refer to an output generated by any of a set of language modeling and feature learning techniques in natural language processing (NLP), in which words or phrases from a vocabulary are mapped to vectors (e.g., of real numbers). Conceptually, generating a word embedding involves a mathematical embedding from a space with one dimension per word to a continuous vector space with a much lower dimension. Each word embedding may be generated by the text element encoder 408 using a variety of techniques known to those of skill in the art, such as a neural network, probabilistic models, etc.

For example, in some embodiments, the text element encoder 408 implements a word2vec model. Word2vec is a group of related models that are used to produce word embeddings. These models are often relatively shallow, two-layer neural networks that may be trained to reconstruct linguistic contexts of words. Word2vec may operate by producing an embedding for a text element within a vector space, potentially including several hundred dimensions, where each unique text element may be assigned a corresponding vector in the space. Word vectors are positioned in the vector space such that words that share common contexts in the corpus are located in close proximity to one another in the space. The processing may occur on a word-by-word basis, for example, and an embedding for each word in a text element may be combined (e.g., concatenated, possibly according to a consistent technique) into a single embedding 434.

Additionally, or alternatively, the text element encoder 408 may comprise one or more units (e.g., layers of a neural network) that can learn and generate font embeddings 434 for the visual aspects of the text elements 426 (e.g., the visual representation of the text elements within the electronic document 310A, such as a portion of an image including the text element(s)). In some cases, particular fonts or font styles (e.g., bold, italics, underline, etc.) may be utilized by keys and/or values, and this information can be "learned" by the text element encoder 408 and used to generate font-based embeddings. In some embodiments, the embeddings 434 include both font-based embeddings and also word embeddings, though in other embodiments the embeddings 434 include word embeddings or font-based embeddings but not both.

A second branch of the processing is performed by a structure encoder 410 using the electronic document 310A itself (together with identifiers/bounding boxes indicating where the text elements are) or portions 428 of the document including the text elements. The structure encoder 410 may comprise a convolutional neural network (CNN) having a decoder and an encoder, which may learn a feature vector 430 for each pixel of each text element. Each of the per-pixel feature vectors for a text element may then be "grouped" by a grouping unit 314, which may create a single grouped feature vector 432 for a text element. The grouping may be a concatenation, an averaging (or other statistical function), etc., based on the individual per-pixel feature vectors 430, and thus is associated with an entire text element.

A third branch of the processing is performed by a location/size unit 412, which may receive location data 424 (e.g., coordinates, bounding box information, etc.), and/or may self-detect such location information on a per-element (or per word, or per-phrase) basis. The location/size unit 412 may generate, using this provided and/or self-detected information, location information 436 indicating this data in a standard format. As one example, this information 436 can be beneficial as it may be the case that keys and values are in different font sizes, and thus the size of the representations of the text elements may be important to assist in differentiating between the height of the words.

A feature fusion unit 416 may operate to concatenate or consolidate all of these outputs from the three processing branches. This "combining" may or may not be simple concatenation. In some embodiments, the inputs are "compressed" (e.g., by additional layers in a neural network that make up the feature fusion unit 416) from a longer mapping into a shorter one by learning what is important for differentiation and separation (of keys and values) purposes. For example, in some usage scenarios it may become evident during training that features from the top branch (shown with a bold circle) are more important than features from the second branch (shown as a dashed linen circle) or features from the third branch (shown as a solid lined circle), so the feature fusion unit 416 may have the ability to learn that and encode the resulting feature vectors 418A-218B with different amounts of data taking from the three branches of inputs. This may occur, for example, by concatenating the three branches of inputs (e.g., the embeddings 434, grouped feature vector 432, and location information 436) and projecting this concatenated value into the resultant feature vector 418 (e.g., having a smaller dimensionality than the concatenated value). In this illustrated example, "three units" from the first branch are taken, "three units" from the second branch are taken, and only "two units" from the third branch are taken; all of which are somehow combined (e.g., consolidated or otherwise transformed) to result in the feature vectors 418A-218B for the pair of text elements.

Notably, although three processing branches are described in this example, in other embodiments more or fewer branches can be utilized. For example, in some embodiments only the "second" branch may be utilized, or in other embodiments only the first and second branches may be utilized, as a few examples.

Based on these feature vectors 418A-218B, the machine learning model(s) 406 can self-modify its features (e.g., using a grouping loss function 420) so that two feature vectors are "close" in the space if both correspond to keys or if both correspond to values, but be far apart if the vectors correspond to a key and a value.

For example, FIG. 5 is a diagram illustrating an exemplary grouping loss function 500 useful for training one or more machine learning models of a key-value differentiation unit according to some embodiments. In this example, x is the input image (e.g., electronic document 310A) and $P_i$ is the i-th pixel location in x. For the sake of simplicity, it is assumed that $P_i \in [0,1]^2$ (i.e., the image dimension is the unit square). Additionally, θ is the weights of the network and $f_\theta(x_{P_i}) \in \mathbb{R}^d$ is the output of the network (e.g., ML model) for the corresponding i-th pixel location in x, where d is the output dimension. Thus, the network is trained to minimize the loss function 500 shown in FIG. 5.

In the loss function 500, the expectation is taken over a uniform sampling strategy of pairs of pixels. The loss may be composed of a summation of two complementary terms. The first, for pixels belonging to the same label ($y_i = y_j$), drives the output embeddings $f_\theta(x_{P_i})$ and $f_\theta(x_{P_j})$ closer together. The second, for pixels with different labels ($y_i \neq y_j$), encourages a separation of the embedding vectors.

Thus, by training the ML models accordingly, the resultant feature vectors for keys and values will be relatively "far" apart, while the resultant feature vectors for keys will be relatively "near" each other and similarly the resultant feature vectors for values will also be relatively "near" each other.

Figure 6:
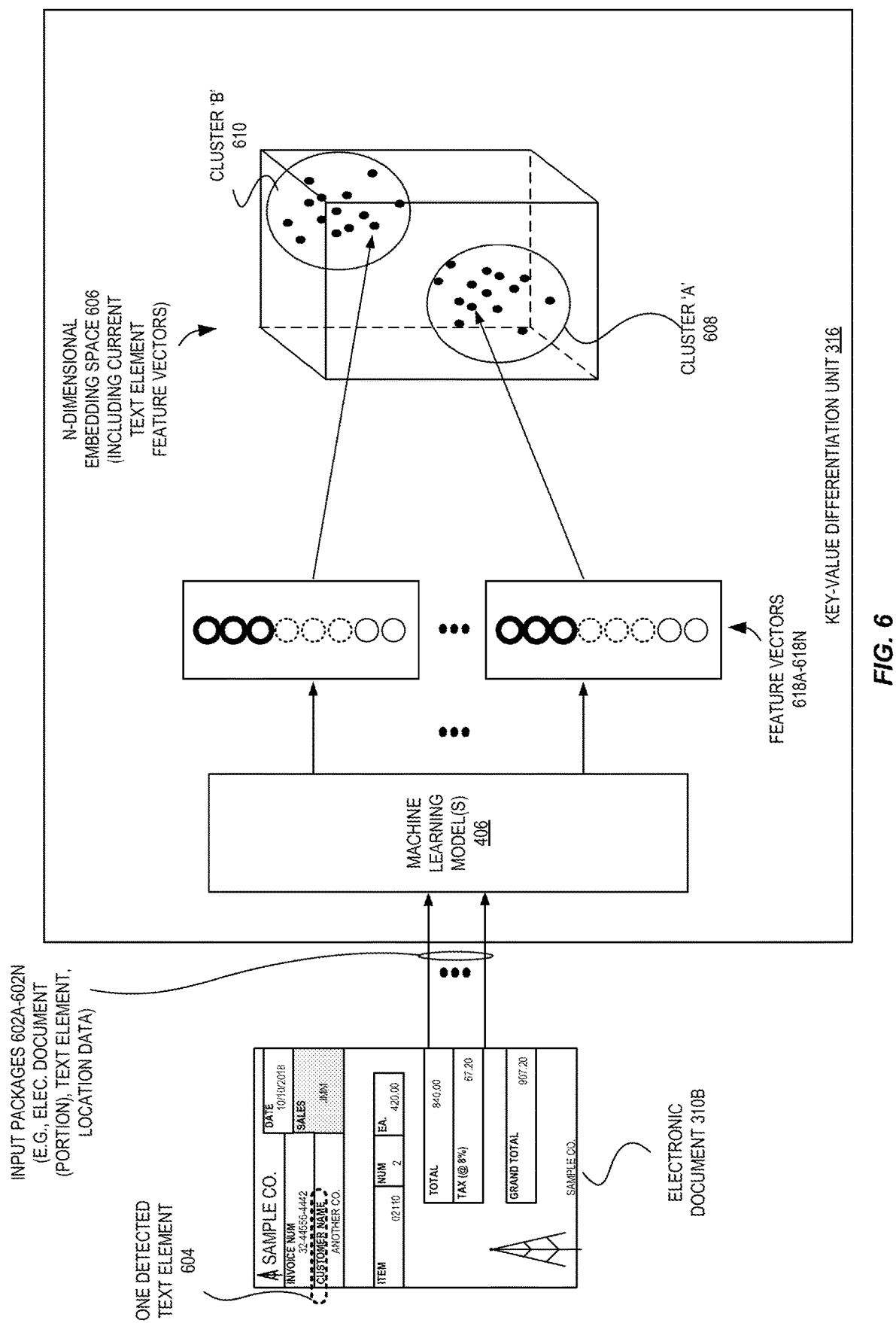
FIG. 6 is a diagram illustrating exemplary stages for inference performed by a key-value differentiation unit according to some embodiments.

For further understanding regarding the use of the key-value differentiation unit 316, FIG. 6 is a diagram illustrating exemplary stages for inference performed by a key-value differentiation unit according to some embodiments. In this example, another electronic document 310B (e.g., an image including a representation of a form document) is shown in which several text elements are detected. One such detected text element 604 is shown—"CUSTOMER NAME." At this point, the system is unaware of whether this text element and all other detected text elements are keys or values.

Thus, for each detected text element, an input package 602A-602N is provided to the key-value differentiation unit 316 for processing, which may include one or more of the entire electronic document 310B (or a portion thereof, such as a portion of the document—e.g., a 10 pixel by 90 pixel image—that includes the corresponding text element), the text element that was detected (e.g., in string form), any location data of the text element (e.g., coordinates, sizing information, a bounding box), etc.

The machine learning model(s) 406 operate upon this data for each text element to generate feature vectors 418A-418N. The key-value differentiation unit 316 may then cluster the feature vectors 418A-418N, e.g., using a clustering technique or algorithm known to those of skill in the art, such as (but not limited to) k-means, k-medoids, Gaussian mixture models, DBSCAN, OPTICS, etc. In some embodiments, the key-value differentiation unit 316 generates two clusters 608 and 610—one to include the keys, and one to the include the values. However, other embodiments may use more clusters, such as three or four (or more) clusters in an attempt to detect "faraway" feature vectors needing further analysis (e.g., that would be located in their own cluster, or with few other vectors) or to detect different classes of the text elements (e.g., a cluster for paragraphs, section titles, explanatory text, etc.). In the latter case, the key-value differentiation unit 316 may again be trained with pairs of text elements, but where the individual text elements may have more than two possible classes (i.e., instead of just being a key or a value, instead being a key or a value or some other class(es)). These feature vectors 618A-618N are shown in FIG. 6 as being represented as dots in a three-dimensional space for ease of visual understanding; however, it is to be understood that in many embodiments the vectors lie in a space of higher dimensionality and thus would lie in an n-dimensional space 606.

Figure 7:
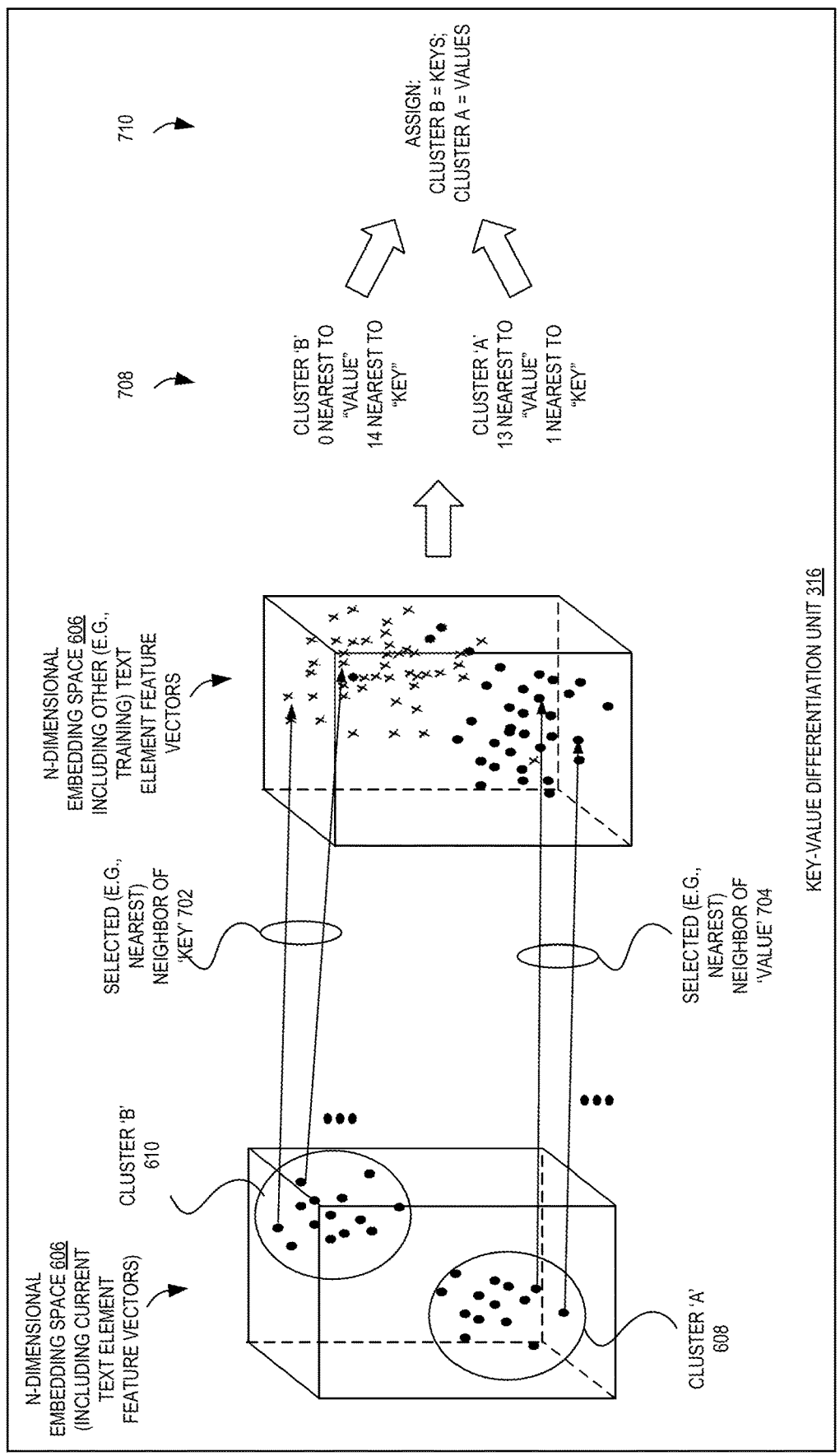
FIG. 7 is a diagram illustrating additional exemplary stages for inference performed by a key-value differentiation unit according to some embodiments.

With two (or more) clusters identified, we turn to FIG. 7, which is a diagram illustrating additional exemplary stages for inference performed by a key-value differentiation unit according to some embodiments.

In some embodiments, for one or more feature vectors of one of the clusters 608/610, a neighbor feature vector from a set of labeled feature vectors is found (e.g., using nearest neighbor techniques known to those of skill in the art, or using a bipartite matching technique such as a minimum weighted bipartite matching algorithm to identify an overall smallest distance between feature vectors of one or multiple clusters). The set of labeled feature vectors may include one or more of those feature vectors created during the training of the machine learning model(s) 406, previously-generated feature vectors, etc. The set of labeled feature vectors are labeled in that each vector is associated with a label of "key" or "value" (or other class(es), as indicated above).

For example, assume all labeled feature vectors are represented as "X" marks in the n-dimensional space 606. For two vectors in cluster B 610, corresponding nearest neighbors 702 are shown via arrows. It can then be determined that these corresponding nearest neighbors 702 have a same label of "key". Thus, in some embodiments, upon some number of vectors in a cluster being associated with a nearest neighbor having a same label, it can be determined that the cluster itself has the same label. In this case, cluster B 610 may thus take the label of "key."

This nearest neighbor determination may be performed only for one or multiple (or all) of the vectors in one cluster, and a most-frequently occurring label (from all nearest neighbors in the labeled set) may be chosen as the cluster label. In some embodiments, the nearest neighbor analysis need not be performed for the other cluster A 608, as it must take on the "other" label (e.g., "keys" when the other cluster is "values," "values" when the other cluster is "keys"). However, in some embodiments, this analysis is performed for both clusters 608/610 to ensure that both come up with an alternative label. (If both clusters were to arrive at a same label, for example, the process may halt, and an error/alert may be generated.)

For example, as shown in FIG. 7, at 708 for cluster B there were 14 nearest neighbors of "key" and 0 nearest neighbors of "value"; likewise, for cluster A there were 13 nearest neighbors of "value" and 1 nearest neighbor of "key." Thus, as shown at 710, cluster B can be determined to be keys, and cluster A can be determined to be value. Thereafter, these labels can be imparted back to the corresponding text elements themselves.

Figure 8:
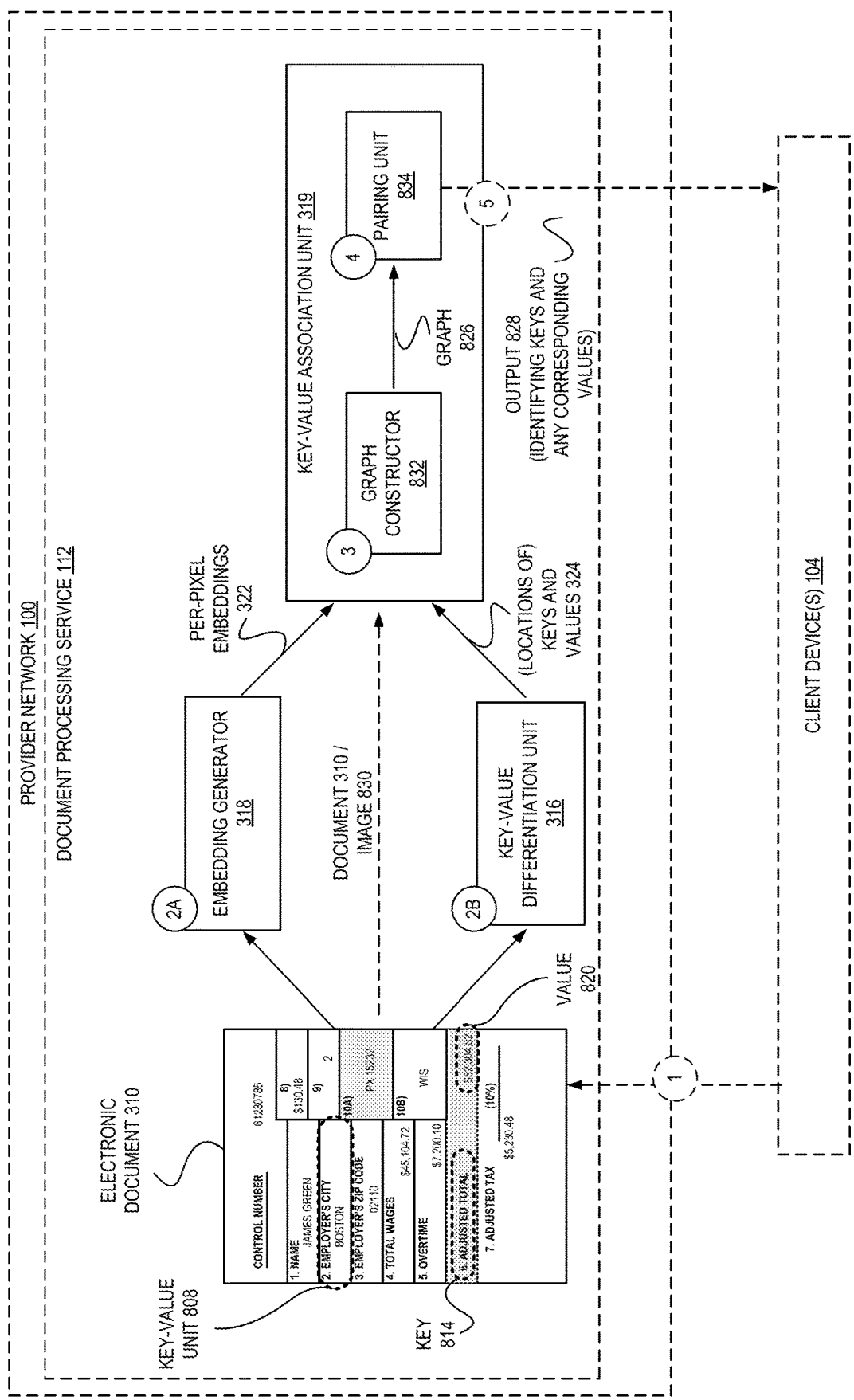
FIG. 8 is a diagram illustrating an environment for automated form understanding via layout-agnostic identification of keys and corresponding values according to some embodiments.

With keys being identified and values being identified by the key-value differentiation unit 316, ones of the keys can be associated with ones of the values by the key-value association unit 319. FIG. 8 is a diagram illustrating an environment for automated form understanding via layout-agnostic identification of keys and corresponding values according to some embodiments.

They key-value association unit 319 described herein can leverage an insight that there does exist an accepted "universal style" for forms. For example, if a person is given a new form to complete, and the form is written in a language that the person cannot read—for example, Arabic or Hebrew or Khmer—most people will still be able to easily understand where are the places in the form where a person is expected to provide an answer—i.e., where are the fillable areas where a "value" to be added. Similarly, for each filled "value," individuals will easily be able to localize the question it answers—in other words, identify what the "key" is that is associated with a particular value. This phenomenon exists despite the fact that a person may be unable to read a form because there are universal styles/conventions related forms—for example, nearly all areas around the globe make use of user interface elements such as checkboxes, a question with an empty line providing a space for the associated answer, a row of adjacent boxes in which a person is to fill in alphanumeric digits (e.g., a phone number, ZIP code, first name, etc.) As this set of conventions is limited, embodiments can "learn" to identify these basic units of visual styles for forms, and then use this learned knowledge to understand new forms (in which the layout is not known in advance). For example, embodiments can segment the different key-value units of the form, distinguish between key regions and value regions, and associate between values and their corresponding keys. A "key-value unit" is a region (for example, a rectangle or other polygon) of an image (of a form or form portion) that includes both the key (e.g., the question a portion of the form is asking, such as "Social Security Number:") and the area where the answer (or "value") is to be filled. Embodiments can create a training set of forms where such key-value units have been annotated, and use a machine learning model (e.g., neural network(s)) to learn to predict whether a pair of two pixels are in a same key-value unit or different key-value unit. The ML model generate a per-pixel embedding, and the ultimate decision can be based on the distance between the embedding vectors of the two pixels from the pair. Once the ML model is trained, embodiments use it to match between corresponding keys and values, which may be obtained beforehand (e.g., by a key value differentiation-unit) or afterward (e.g., using an OCR engine to analyze the key and value boxes), thus enabling the system to "read" the form automatically via knowledge of matching keys and values. Moreover, some embodiments using this approach can bypass the need to "read" all the text on the form, which oftentimes contains a lot of irrelevant content such as filling instructions, form version indicators, legal notices, and so on.

In this example environment, the key-value association unit 319 may be implemented as a component of a document processing service 112, which as indicated above may be implemented using software executed by one or multiple computing devices, and in various embodiments could be implemented in hardware or a combination of both hardware and software. For example, in some embodiments, such as when the key-value association unit 319 is implemented as a component or part of a service (e.g., document processing service 112) within a provider network 100 and needs to operate in large scale to process substantial numbers of requests, the key-value association unit 319 (and/or document processing service 112) may be implemented in a distributed manner—e.g., using software executed by multiple computing devices in a same or different geographic location(s).

As indicated above, the document processing service 112 in some embodiments is implemented via software, and includes several sub-components that may also be implemented in whole or in part using software, such as a key-value differentiation unit 316, the key-value association unit 319, an embedding generator 318, etc. The document processing service 112 may perform various functions upon data (e.g., images) carrying or providing representations of documents. For example, the document processing service 112 may identify text represented within an image and process the text in intelligent ways, e.g., based on where the text is located within the representation.

As shown by optional circle (1), an electronic document 310 may be provided in some manner. For example, a client device 104 of a user 106 may upload the electronic document 310 to a document processing service 112, to a storage service of a provider network 100, or to another location.

In this example, the electronic document 310 includes a representation of a form with multiple key-value units. One example key-value unit 808 is shown and as a rectangular region including a key of "2. EMPLOYER'S CITY" with a corresponding value of "BOSTON." In some scenarios a key-value unit may comprise a rectangle or square area from the electronic document 310, though in other embodiments the key-value unit may be of a different shape, e.g., some other type of polygon that delineates a region including a key and a value. Thus, the electronic document 310 includes one or multiple key-value units 808, one or multiple corresponding keys 814, and one or more values 820—notably, it is not always the case that a key 814 will have a corresponding value 820.

In some embodiments, the electronic document 310 (or a derivation therefrom, such as an image file corresponding to a visual representation of another format of electronic document 310) is provided at circle (2A) to an embedding generator 318 that generates a set of per-pixel embeddings 322. The embedding generator 318 in some embodiments comprises a machine learning (ML) model, such as a neural network, that was trained utilizing a loss function that separates the embeddings it generates for pixels in different key-value units (that is, places them far apart according to a distance measure in an n-dimensional space) and places the embeddings it generates for pixels in the same key-value unit close together.

As one example, the ML model may comprise a neural network that uses three parallel lines of two convolutional blocks each. The three parallel lines employ three sizes of convolution kernels (e.g., small, medium, and large). All six feature sets may be collected (e.g., three resolutions and two convolutional blocks) and reduced to the embedding dimension by 1*1 convolutions. In this example, the loss function used for training this network may sample pairs of pixels and try to correctly predict whether they belong to the same key-value unit or not. For example, the distance between the embedding vectors may be converted to a probability that the two pixels belong to the same segment and measure the quality of the embedding by the cross-entropy loss between the actual predictions for pixel pairs, and the ground-truth 1/0 probabilities for these pixel pairs. The pairs may be sampled both from the same segments, and from different ones.

As another example, the embedding generator 318 may comprise a network based on a U-net backbone that was trained with a loss function that tries to have the embeddings of pixels in different key-value units far apart, and those of pixels in the same key-value unit close together. Notably, this loss function formulation is quite similar to the loss function of the first example, though the two loss formulations are not identical.

In some embodiments, the embedding generator 318 may utilize convolutions via multiple filters at several different scales (e.g., 3×3 pixels, 5×5 pixels, etc.) and, e.g., implement linear combinations of these to generate the embeddings 322. For example, the embedding generator 318 might take a window (of size 3×3 pixels), run the window across the image, and do a convolution with this image portion, resulting in an embedding.

In some embodiments, the embedding generator 318 analyzes convolutions at multiple filters at several scales, concatenates them, and performs a linear combination of the results, resulting in the embeddings. The multiples scales (e.g., 2×2, 3×3, 5×5) may be used to allow for a large enough scale (or bigger box) to be used that is able "see" the area surrounding the immediate pixel—as a "correct" size may not be determinable, embodiments utilize multiple scales by weighting them with weights that are being learned, allowing the embedding generator 318 to adapt to the actual scales seen in the training run. In some embodiments, each per-pixel embedding may be a vector of multiple values, e.g., a 15-number vector.

The electronic document 310 may also be operated upon by a key-value differentiation unit 316 (e.g., partially or completely in parallel with the embedding generator 318 or at a different time) to identify locations 324 of keys and values from the electronic document 310, and optionally the actual keys and values themselves.

The per-pixel embeddings 322 and locations 324 of keys and value (or portions of the keys and values), optionally along with the original electronic document 310 or image version 830 thereof, are provided to the key-value association unit 319 (e.g., via a queue, via a shared storage location, within a request message or function call, etc.).

At circle (3), a graph constructor 832 may use this information to construct a graph 826. The graph 826 may be a weighted bipartite graph with a first set of nodes corresponding to the keys, and a second set of nodes corresponding to the values. Each node from the first set of nodes (representing the keys) may include an edge to each of the second set of nodes (representing the values). Each such edge has a corresponding weight that is determined by the graph constructor 832 based on the per-pixel embeddings 322.

To determine a weight, between a "key" node and an "edge" node, a pixel from the region of the key (e.g., some sort of center or edge pixel) is identified and a pixel from the region of the value is identified. Conceptually, a line can be stretched between these pixels, and the line can be "traced" to identify an "edge" in the embeddings where there is a large "jump" in the distance between two "neighboring" (e.g., one pixel away, two pixels away, three pixels away, etc.) embeddings—in this case when a large jump is found, it is likely that the key and the value are not of the same key-value unit. For example, the line can be traced at an interval of some number of pixels (e.g., 3 pixels), and the distance between each pairing of two embeddings can be determined using one of a variety of types of distance measure formulations known to those of skill in the art. The overall edge weight may be based on these distances—e.g., a maximum distance value found may be used as the edge's weight.

Alternatively, in some embodiments (perhaps when the embedding generator 318 employs the network described above based on a U-net backbone or similar) the edge weight may simply be set as the distance between an average embedding from each of the two regions (i.e., the region or polygon/bounding box encompassing the key, and the region or polygon/bounding box encompassing the value).

With the constructed bipartite graph 826 with edge weights, at circle (4) a pairing unit 834 may "pair" up ones of the keys with one of the values based on a graph analysis solving an association problem. For example, in some embodiments the pairing unit 834 may partition the graph to identify pairs of the keys with the values that results in an overall minimum edge cost.

Alternatively, a greedy approach could be employed, e.g., to pair the two nodes with an overall lowest edge weight, remove those nodes and edges from the graph (or from further consideration), and then pair a next two nodes with a next minimal edge weight, and so on. However, although this approach is sufficient in many scenarios, the overall results in some cases may be better using a non-greedy overall graph analysis described above, which optimizes for a minimum overall distance for the graph.

At this point, the key-value association unit 319, has a set of all keys with their associated values, and this information may be used in a variety of ways—e.g., represented in JavaScript Object Notation (JSON) format and sent back to a client device 104, stored at some storage location, etc.

For further detail, FIG. 9 is a diagram illustrating an exemplary loss function 900 useful for training one or more machine learning models of the embedding generator 318 according to some embodiments. In some embodiments, the distance between the embedding vectors is converted to a probability that the two pixels belong to the same segment, and the quality of the embedding is measured by the cross-entropy loss between the actual predictions for pixel pairs, and the ground-truth 1/0 probabilities for these pixel pairs. The pairs are sampled both from the same segments, and from different ones.

Thus, in some embodiments, the network is trained by minimizing the following loss 900 shown, where S is the set of pixels that we choose, $y_p$ is the instance label of pixel p, and $w_{pq}$ is the weight of the loss on the similarity between p and q. The weights $w_{pq}$ are set to values inversely proportional to the size of the instances p and q belong to, so the loss will not become biased towards the larger examples. The weights may be normalized so that $\Sigma_{p,q} w_{pq} = 1$.

Figure 10:
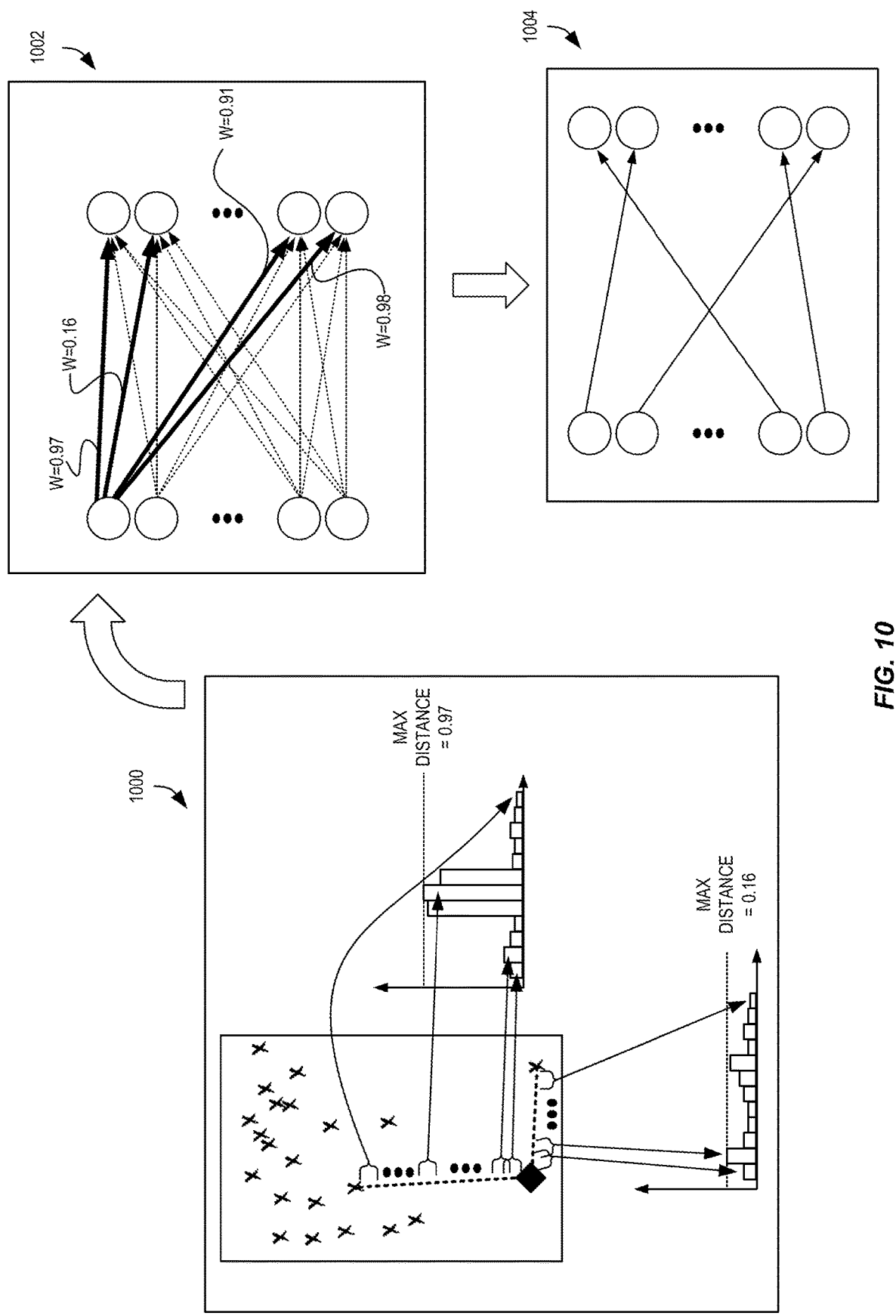
FIG. 10 is a diagram illustrating exemplary edge weight determination, graph construction, and graph partitioning operations used for automated form understanding via layout-agnostic identification of keys and corresponding values according to some embodiments.

For further clarity of understanding, FIG. 10 is a diagram illustrating exemplary edge weight determination, graph construction, and graph partitioning operations used for automated form understanding via layout-agnostic identification of keys and corresponding values according to some embodiments. As shown at 1000, a center pixel of one "key" node is represented as being a black diamond and center pixels of the "value" nodes are represented as "X" marks. In this example, two dotted lines are illustrated connecting a center point of the key with two different values. Distances calculated based on three-pixel windows from the horizontal line are shown on the graph on the bottom. In this example, distances are real values between 0.0 (indicating a high likelihood of the pixels being in a same key-value unit) and 1.0 (indicating a low likelihood of the pixels being in a same key-value unit). As shown in the graph on the bottom, a largest (or maximum) distance is identified as 0.16.

Similarly, the vertical dotted line is also walked in three-pixel windows and the distances between these embeddings is shown in the graph on the right side. In this case, a large "edge" is detected in approximately the middle of the line, which likely corresponds to a border between different key-value units. Thus, in this case a maximum distance is identified as 0.97. This process can repeat between the key pixel and all the other "center" value pixels, and the maximum distances can be used to create weights for edges in a graph that is constructed as shown at 1002. In this example, the bipartite graph includes a column on the left for the keys, each of which is connected to each of the nodes in the column on the right representing values. Each edge comprises a weight value, e.g., the maximum distance found on the line between the corresponding center points at 1000. In this example, only a few weights for one of the key nodes is shown for simplicity of illustration and understanding—here, 0.97, 0.16, 0.91, and 0.98—though there may be more or fewer edges for each key node, and there may be more or fewer key or value nodes in different scenarios depending on the number of keys and values that were identified in the document.

At 1004, the graph can be partitioned such that every key node is connected zero or one value nodes. This may include the use of a non-greedy optimization algorithm to find an overall partition resulting in a minimum total edge weight, a greedy algorithm that selects the smallest edge weights first and continues on, etc.

In some embodiments, an edge will only be selected and used to associate a key and a value if the edge weight is less than a particular threshold distance/weight, which may allow for no value to be associated with a key, which often happens if a value field in the form is blank.

Accordingly, the keys are associated with their corresponding values, which may be used to generate a result for the document processing described herein.

Figure 11:
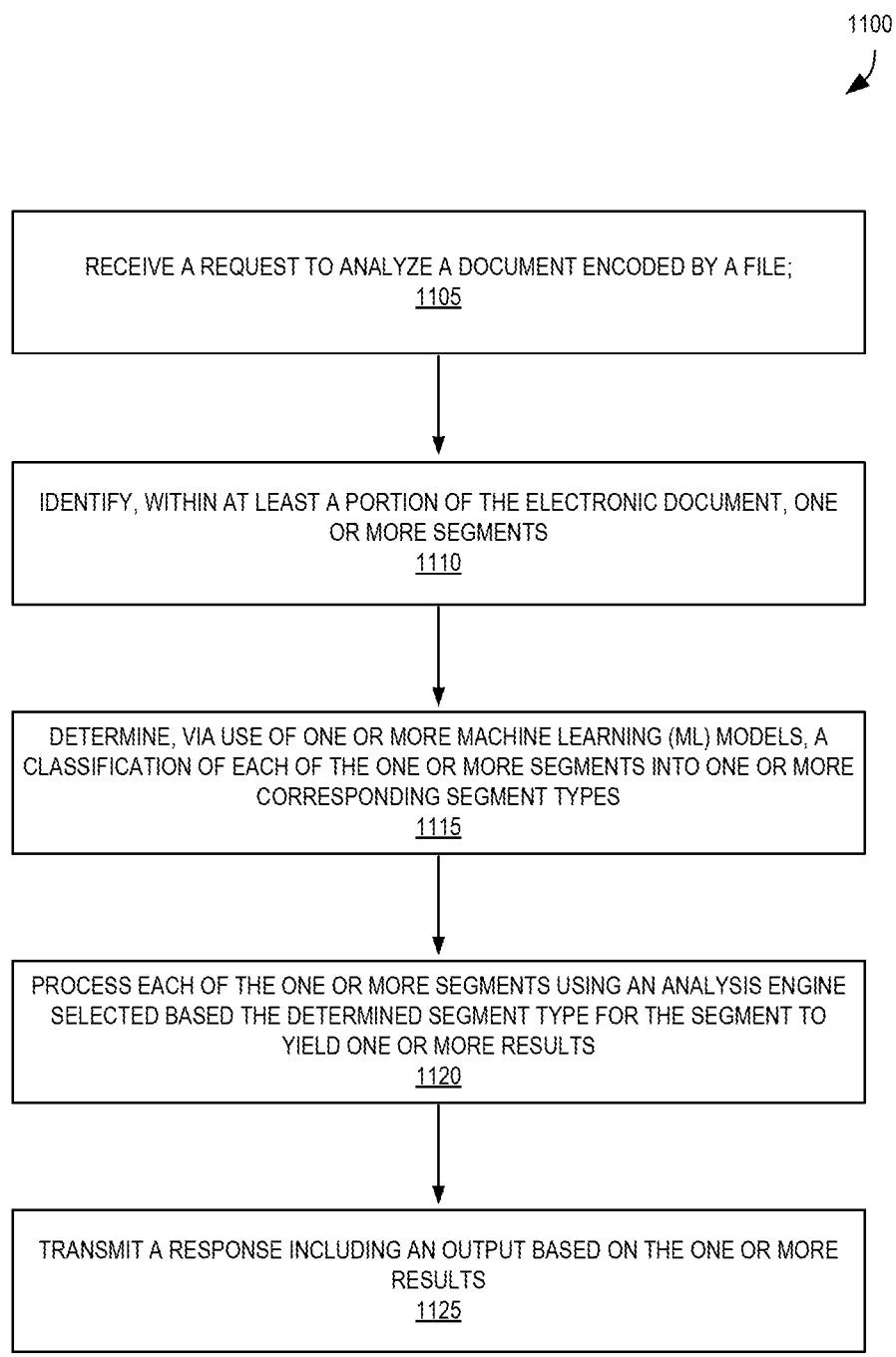
FIG. 11 is a flow diagram illustrating exemplary operations of a method for layout-agnostic complex document processing according to some embodiments.

FIG. 11 is a flow diagram illustrating exemplary operations 1100 of a method for layout-agnostic complex document processing according to some embodiments. Some or all of the operations 1100 (or other processes described herein, or variations, and/or combinations thereof) are performed under the control of one or more computer systems configured with executable instructions and are implemented as code (e.g., executable instructions, one or more computer programs, or one or more applications) executing collectively on one or more processors, by hardware or combinations thereof. The code is stored on a computer-readable storage medium, for example, in the form of a computer program comprising instructions executable by one or more processors. The computer-readable storage medium is non-transitory. In some embodiments, one or more (or all) of the operations 1100 are performed by the document processing service 112 of the other figures.

The operations 1100 include, at block 1105, receiving a request to analyze a document encoded by a file. The request may include data of the file or identify a storage location of the file. The file may be an image (e.g., from a digital camera or optical sensor) taken of the document, or a document file type such as a PDF. In some embodiments, the request is received at a web service endpoint of a provider network and may be carried by an HTTP request message.

According to some embodiments, the operations 1100 may optionally include determining that a value (e.g., a size of the file, a number of pages of the file, a number of pending requests for a same user, etc.) meets or exceeds a threshold; determining that an amount of idle compute capacity does not meet or exceed an availability threshold; and (e.g., in response to these two determinations) suspending processing of the file for a period of time. Such thresholds may be configured to prevent the processing of a particularly large document (e.g., a 1 GB document, a million-page document) when there is not currently (or, projected no to be) sufficient processing capacity to both process the large document and process other requests from other users. Additionally (or alternatively), some embodiments set a threshold based on a number of requests being processed by the system for a particular user (e.g., 5 concurrent requests), to prevent any one user from submitting so many processing requests at a single point in time (thus, somewhat monopolizing the service) that the performance of the service would be impacted for other users. Using such thresholds, the performance of the system can be ensured for its users under these problematic use case scenarios.

The operations 1100 include, at block 1110, identifying, within at least a portion of the electronic document, one or more segments. The identifying may include using one or more ML models to identify distinct portions of the document that may be of different segment types. The portion may comprise a "chunk" of the document, where a chunk may be a number of pages.

The operations 1100 include, at block 1115, determining, via use of one or more machine learning (ML) models, a classification of each of the one or more segments into one or more corresponding segment types. The one or more ML models may have been trained using labeled training images depicting receipts, forms, etc., so that the ML model(s) can classify these types of segments. At least one of the one or more corresponding segment types may be one of: form, receipt, invoice, paragraph, or table.

At block 1120, the operations 1100 include processing each of the one or more segments using an analysis engine selected based the determined segment type for the segment to yield one or more results. The processing may include use of specific ML models for the particular segment types. For example, the processing for a form segment type may include detecting keys and values using a first one or more ML models, and then detecting pairings of ones of the keys with ones of the values using a second one or more ML models.

The operations 1100 include, at block 1125, transmitting a response including an output based on the one or more results. In some embodiments, the response is destined to a client device located outside of the provider network.

In some embodiments, the operations 1100 optionally include generating a job identifier (ID) of a job; transmitting the job ID within a second response, wherein the second response is associated with the request; and receiving a second request for the output of the job, the second request comprising the job ID, wherein the response is associated with the second request.

According to some embodiments, the operations 1100 may optionally include splitting the file into a plurality of chunks; analyzing, at least partially in a parallel manner, the plurality of chunks to yield a plurality of chunk results, wherein the portion is from a first chunk of the plurality of chunks; determining that the plurality of chunks have all been analyzed; and combining the plurality of chunk results into the output value.

According to some embodiments, the response comprises a HyperText Transfer Protocol (HTTP) response message sent in response to the request, the request comprising an HTTP request message; the HTTP request message was received at a first Application Programming Interface (API) endpoint; and the operations further comprise: sending another HTTP request message to another endpoint associated with an analysis service, the another HTTP request message including data of the file or identifying a location of the file, and receiving another HTTP response message from the another endpoint. In some embodiments, at least one of the one or more corresponding segment types is form; and the processing of at least one of the one or more segments using the analysis engine comprises: identifying a plurality of keys of the form and a plurality of values of the form; and determining a plurality of key-value pairings, wherein at least one of the plurality of key-value pairings comprises one of the plurality of keys and one of the plurality of values that corresponds to the one key. In some embodiments, identifying the plurality of keys and the plurality of values is based on use of a second machine learning (ML) model; and determining the plurality of key-value pairings is based on use of a third ML model.

Figure 12:
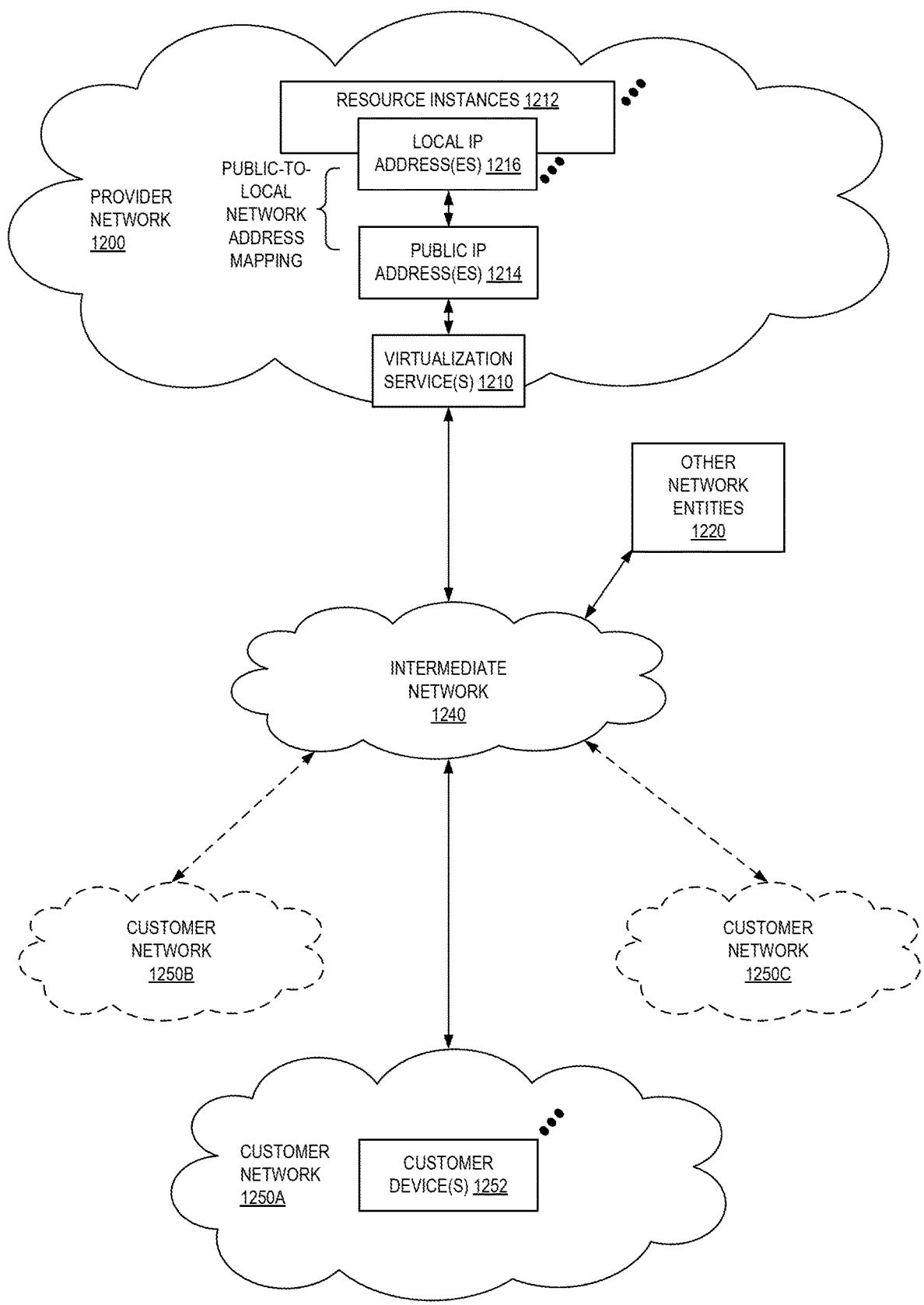
FIG. 12 illustrates an example provider network environment according to some embodiments.

FIG. 12 illustrates an example provider network (or "service provider system") environment according to some embodiments. A provider network 1200 may provide resource virtualization to customers via one or more virtualization services 1210 that allow customers to purchase, rent, or otherwise obtain instances 1212 of virtualized resources, including but not limited to computation and storage resources, implemented on devices within the provider network or networks in one or more data centers. Local Internet Protocol (IP) addresses 1216 may be associated with the resource instances 1212; the local IP addresses are the internal network addresses of the resource instances 1212 on the provider network 1200. In some embodiments, the provider network 1200 may also provide public IP addresses 1214 and/or public IP address ranges (e.g., Internet Protocol version 4 (IPv4) or Internet Protocol version 6 (IPv6) addresses) that customers may obtain from the provider 1200.

Conventionally, the provider network 1200, via the virtualization services 1210, may allow a customer of the service provider (e.g., a customer that operates one or more client networks 1250A-1250C including one or more customer device(s) 1252) to dynamically associate at least some public IP addresses 1214 assigned or allocated to the customer with particular resource instances 1212 assigned to the customer. The provider network 1200 may also allow the customer to remap a public IP address 1214, previously mapped to one virtualized computing resource instance 1212 allocated to the customer, to another virtualized computing resource instance 1212 that is also allocated to the customer. Using the virtualized computing resource instances 1212 and public IP addresses 1214 provided by the service provider, a customer of the service provider such as the operator of customer network(s) 1250A-1250C may, for example, implement customer-specific applications and present the customer's applications on an intermediate network 1240, such as the Internet. Other network entities 1220 on the intermediate network 1240 may then generate traffic to a destination public IP address 1214 published by the customer network(s) 1250A-1250C; the traffic is routed to the service provider data center, and at the data center is routed, via a network substrate, to the local IP address 1216 of the virtualized computing resource instance 1212 currently mapped to the destination public IP address 1214. Similarly, response traffic from the virtualized computing resource instance 1212 may be routed via the network substrate back onto the intermediate network 1240 to the source entity 1220.

Local IP addresses, as used herein, refer to the internal or "private" network addresses, for example, of resource instances in a provider network. Local IP addresses can be within address blocks reserved by Internet Engineering Task Force (IETF) Request for Comments (RFC) 1918 and/or of an address format specified by IETF RFC 4193 and may be mutable within the provider network. Network traffic originating outside the provider network is not directly routed to local IP addresses; instead, the traffic uses public IP addresses that are mapped to the local IP addresses of the resource instances. The provider network may include networking devices or appliances that provide network address translation (NAT) or similar functionality to perform the mapping from public IP addresses to local IP addresses and vice versa.

Public IP addresses are Internet mutable network addresses that are assigned to resource instances, either by the service provider or by the customer. Traffic routed to a public IP address is translated, for example via 1:1 NAT, and forwarded to the respective local IP address of a resource instance.

Some public IP addresses may be assigned by the provider network infrastructure to particular resource instances; these public IP addresses may be referred to as standard public IP addresses, or simply standard IP addresses. In some embodiments, the mapping of a standard IP address to a local IP address of a resource instance is the default launch configuration for all resource instance types.

At least some public IP addresses may be allocated to or obtained by customers of the provider network 1200; a customer may then assign their allocated public IP addresses to particular resource instances allocated to the customer. These public IP addresses may be referred to as customer public IP addresses, or simply customer IP addresses. Instead of being assigned by the provider network 1200 to resource instances as in the case of standard IP addresses, customer IP addresses may be assigned to resource instances by the customers, for example via an API provided by the service provider. Unlike standard IP addresses, customer IP addresses are allocated to customer accounts and can be remapped to other resource instances by the respective customers as necessary or desired. A customer IP address is associated with a customer's account, not a particular resource instance, and the customer controls that IP address until the customer chooses to release it. Unlike conventional static IP addresses, customer IP addresses allow the customer to mask resource instance or availability zone failures by remapping the customer's public IP addresses to any resource instance associated with the customer's account. The customer IP addresses, for example, enable a customer to engineer around problems with the customer's resource instances or software by remapping customer IP addresses to replacement resource instances.

Figure 13:
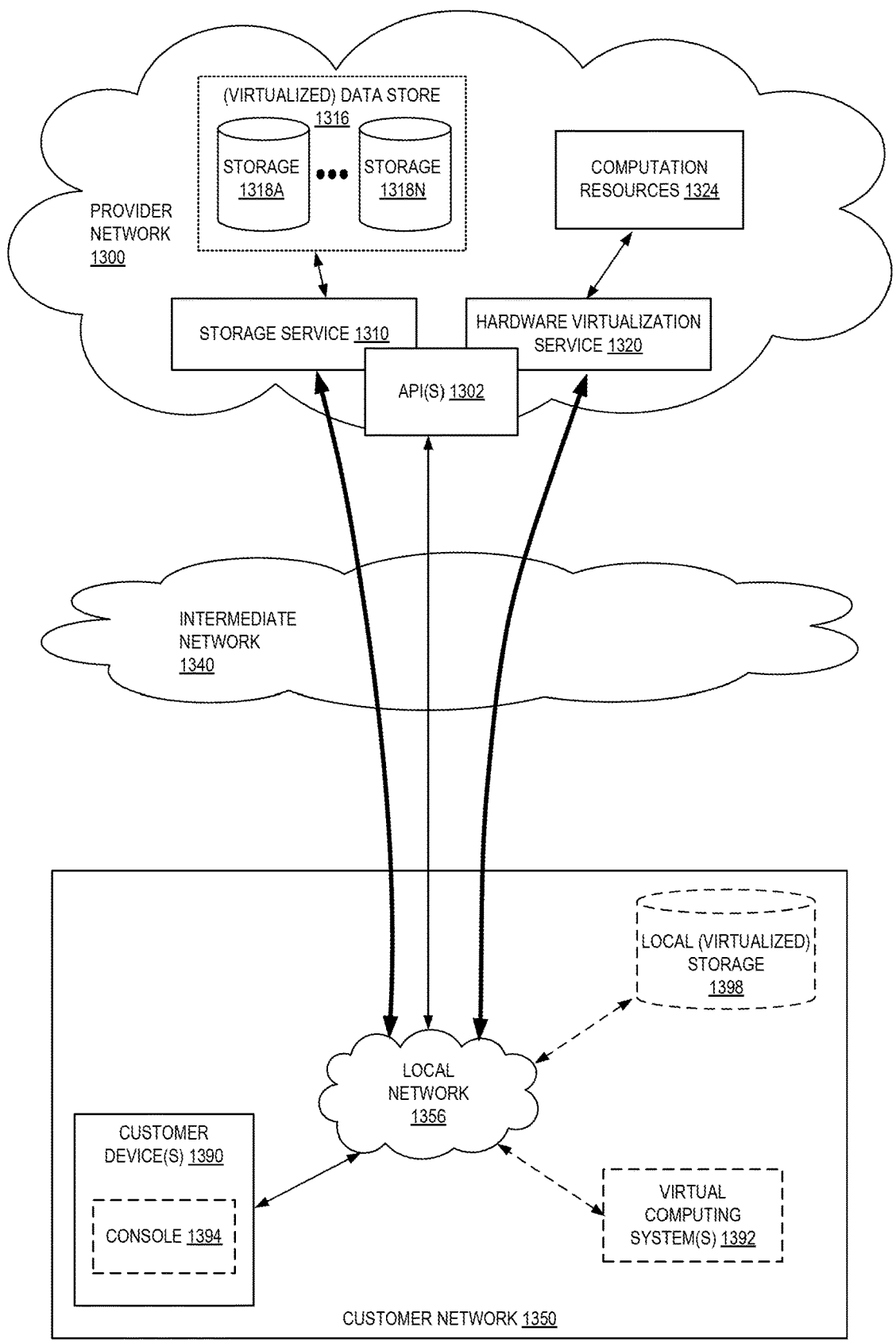
FIG. 13 is a block diagram of an example provider network that provides a storage service and a hardware virtualization service to customers according to some embodiments.

FIG. 13 is a block diagram of an example provider network that provides a storage service and a hardware virtualization service to customers, according to some embodiments. Hardware virtualization service 1320 provides multiple computation resources 1324 (e.g., VMs) to customers. The computation resources 1324 may, for example, be rented or leased to customers of the provider network 1300 (e.g., to a customer that implements customer network 1350). Each computation resource 1324 may be provided with one or more local IP addresses. Provider network 1300 may be configured to route packets from the local IP addresses of the computation resources 1324 to public Internet destinations, and from public Internet sources to the local IP addresses of computation resources 1324.

Provider network 1300 may provide a customer network 1350, for example coupled to intermediate network 1340 via local network 1356, the ability to implement virtual computing systems 1392 via hardware virtualization service 1320 coupled to intermediate network 1340 and to provider network 1300. In some embodiments, hardware virtualization service 1320 may provide one or more APIs 1302, for example a web services interface, via which a customer network 1350 may access functionality provided by the hardware virtualization service 1320, for example via a console 1394 (e.g., a web-based application, standalone application, mobile application, etc.). In some embodiments, at the provider network 1300, each virtual computing system 1392 at customer network 1350 may correspond to a computation resource 1324 that is leased, rented, or otherwise provided to customer network 1350.

From an instance of a virtual computing system 1392 and/or another customer device 1390 (e.g., via console 1394), the customer may access the functionality of storage service 1310, for example via one or more APIs 1302, to access data from and store data to storage resources 1318A-1318N of a virtual data store 1316 (e.g., a folder or "bucket", a virtualized volume, a database, etc.) provided by the provider network 1300. In some embodiments, a virtualized data store gateway (not shown) may be provided at the customer network 1350 that may locally cache at least some data, for example frequently-accessed or critical data, and that may communicate with storage service 1310 via one or more communications channels to upload new or modified data from a local cache so that the primary store of data (virtualized data store 1316) is maintained. In some embodiments, a user, via a virtual computing system 1392 and/or on another customer device 1390, may mount and access virtual data store 1316 volumes via storage service 1310 acting as a storage virtualization service, and these volumes may appear to the user as local (virtualized) storage 1398.

While not shown in FIG. 13, the virtualization service(s) may also be accessed from resource instances within the provider network 1300 via API(s) 1302. For example, a customer, appliance service provider, or other entity may access a virtualization service from within a respective virtual network on the provider network 1300 via an API 1302 to request allocation of one or more resource instances within the virtual network or within another virtual network.

Illustrative System

Figure 14:
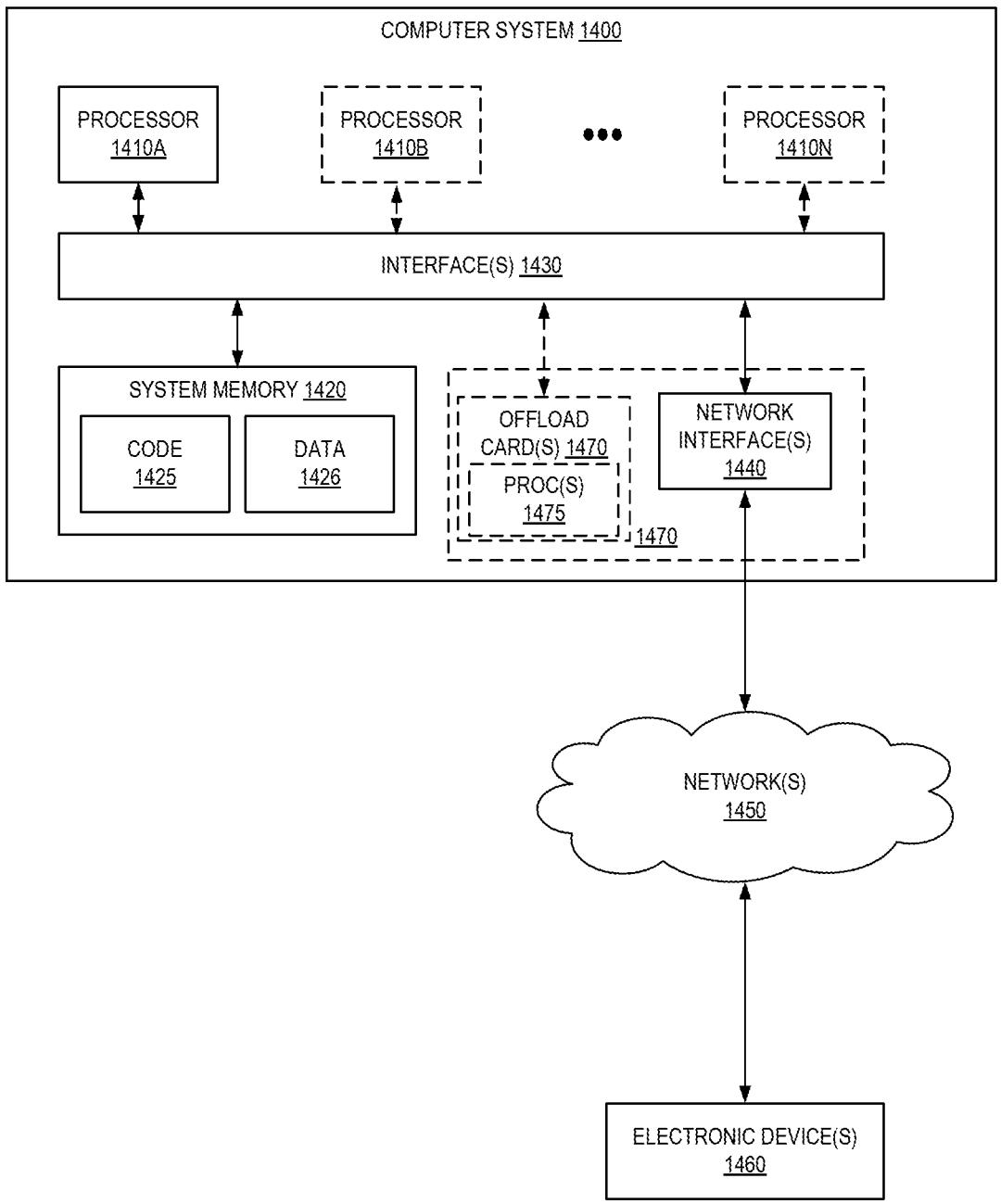
FIG. 14 is a block diagram illustrating an example computer system that may be used in some embodiments.

In some embodiments, a system that implements a portion or all of the techniques for layout-agnostic complex document processing as described herein may include a general-purpose computer system that includes or is configured to access one or more computer-accessible media, such as computer system 1400 illustrated in FIG. 14. In the illustrated embodiment, computer system 1400 includes one or more processors 1410 coupled to a system memory 1420 via an input/output (I/O) interface 1430. Computer system 1400 further includes a network interface 1440 coupled to I/O interface 1430. While FIG. 14 shows computer system 1400 as a single computing device, in various embodiments a computer system 1400 may include one computing device or any number of computing devices configured to work together as a single computer system 1400.

In various embodiments, computer system 1400 may be a uniprocessor system including one processor 1410, or a multiprocessor system including several processors 1410 (e.g., two, four, eight, or another suitable number). Processors 1410 may be any suitable processors capable of executing instructions. For example, in various embodiments, processors 1410 may be general-purpose or embedded processors implementing any of a variety of instruction set architectures (ISAs), such as the x86, ARM, PowerPC, SPARC, or MIPS ISAs, or any other suitable ISA. In multiprocessor systems, each of processors 1410 may commonly, but not necessarily, implement the same ISA.

System memory 1420 may store instructions and data accessible by processor(s) 1410. In various embodiments, system memory 1420 may be implemented using any suitable memory technology, such as random-access memory (RAM), static RAM (SRAM), synchronous dynamic RAM (SDRAM), nonvolatile/Flash-type memory, or any other type of memory. In the illustrated embodiment, program instructions and data implementing one or more desired functions, such as those methods, techniques, and data described above are shown stored within system memory 1420 as code 1425 and data 1426.

In one embodiment, I/O interface 1430 may be configured to coordinate I/O traffic between processor 1410, system memory 1420, and any peripheral devices in the device, including network interface 1440 or other peripheral interfaces. In some embodiments, I/O interface 1430 may perform any necessary protocol, timing or other data transformations to convert data signals from one component (e.g., system memory 1420) into a format suitable for use by another component (e.g., processor 1410). In some embodiments, I/O interface 1430 may include support for devices attached through various types of peripheral buses, such as a variant of the Peripheral Component Interconnect (PCI) bus standard or the Universal Serial Bus (USB) standard, for example. In some embodiments, the function of I/O interface 1430 may be split into two or more separate components, such as a north bridge and a south bridge, for example. Also, in some embodiments some or all of the functionality of I/O interface 1430, such as an interface to system memory 1420, may be incorporated directly into processor 1410.

Network interface 1440 may be configured to allow data to be exchanged between computer system 1400 and other devices 1460 attached to a network or networks 1450, such as other computer systems or devices as illustrated in FIG. 1, for example. In various embodiments, network interface 1440 may support communication via any suitable wired or wireless general data networks, such as types of Ethernet network, for example. Additionally, network interface 1440 may support communication via telecommunications/telephony networks such as analog voice networks or digital fiber communications networks, via storage area networks (SANs) such as Fibre Channel SANs, or via I/O any other suitable type of network and/or protocol.

In some embodiments, a computer system 1400 includes one or more offload cards 1470 (including one or more processors 1475, and possibly including the one or more network interfaces 1440) that are connected using an I/O interface 1430 (e.g., a bus implementing a version of the Peripheral Component Interconnect-Express (PCI-E) standard, or another interconnect such as a QuickPath interconnect (QPI) or UltraPath interconnect (UPI)). For example, in some embodiments the computer system 1400 may act as a host electronic device (e.g., operating as part of a hardware virtualization service) that hosts compute instances, and the one or more offload cards 1470 execute a virtualization manager that can manage compute instances that execute on the host electronic device. As an example, in some embodiments the offload card(s) 1470 can perform compute instance management operations such as pausing and/or un-pausing compute instances, launching and/or terminating compute instances, performing memory transfer/copying operations, etc. These management operations may, in some embodiments, be performed by the offload card(s) 1470 in coordination with a hypervisor (e.g., upon a request from a hypervisor) that is executed by the other processors 1410A-1410N of the computer system 1400. However, in some embodiments the virtualization manager implemented by the offload card(s) 1470 can accommodate requests from other entities (e.g., from compute instances themselves), and may not coordinate with (or service) any separate hypervisor.

In some embodiments, system memory 1420 may be one embodiment of a computer-accessible medium configured to store program instructions and data as described above. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computer system 1400 via I/O interface 1430. A non-transitory computer-accessible storage medium may also include any volatile or non-volatile media such as RAM (e.g., SDRAM, double data rate (DDR) SDRAM, SRAM, etc.), read only memory (ROM), etc., that may be included in some embodiments of computer system 1400 as system memory 1420 or another type of memory. Further, a computer-accessible medium may include transmission media or signals such as electrical, electromagnetic, or digital signals, conveyed via a communication medium such as a network and/or a wireless link, such as may be implemented via network interface 1440.

In the preceding description, various embodiments are described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Bracketed text and blocks with dashed borders (e.g., large dashes, small dashes, dot-dash, and dots) are used herein to illustrate optional operations that add additional features to some embodiments. However, such notation should not be taken to mean that these are the only options or optional operations, and/or that blocks with solid borders are not optional in certain embodiments.

Reference numerals with suffix letters (e.g., 1318A-1318N) may be used to indicate that there can be one or multiple instances of the referenced entity in various embodiments, and when there are multiple instances, each does not need to be identical but may instead share some general traits or act in common ways. Further, the particular suffixes used are not meant to imply that a particular amount of the entity exists unless specifically indicated to the contrary. Thus, two entities using the same or different suffix letters may or may not have the same number of instances in various embodiments.

References to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Moreover, in the various embodiments described above, unless specifically noted otherwise, disjunctive language such as the phrase "at least one of A, B, or C" is intended to be understood to mean either A, B, or C, or any combination thereof (e.g., A, B, and/or C). As such, disjunctive language is not intended to, nor should it be understood to, imply that a given embodiment requires at least one of A, at least one of B, or at least one of C to each be present.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

What is claimed is:

1. A computer-implemented method comprising:
    receiving a first request to analyze a document encoded by a file;
    generating a job identifier (ID) of a job;
    transmitting the job ID within a first response, wherein the first response is associated with the first request;
    identifying, within at least a portion of the document, one or more segments;
    determining, via use of one or more machine learning (ML) models, a classification of each of the one or more segments into one or more corresponding segment types;
    processing each of the one or more segments using an analysis engine selected based on the determined segment type for the segment to yield one or more results;
    receiving a second request for an output of the job, the second request comprising the job ID; and
    transmitting a second response including an output based on the one or more results wherein the second response is associated with the second request.

2. The computer-implemented method of claim 1, wherein the first request includes data of the file or identifies a location of the file.

3. The computer-implemented method of claim 1, further comprising:
    splitting the file into a plurality of chunks;
    analyzing, at least partially in a parallel manner, the plurality of chunks to yield a plurality of chunk results, wherein the portion is from a first chunk of the plurality of chunks;
    determining that the plurality of chunks have all been analyzed; and
    combining the plurality of chunk results into an output value that is included within the output.

4. The computer-implemented method of claim 1, further comprising:
    determining that a value meets or exceeds a threshold, the value comprising a size of the file, a number of pages of the file, or an amount of requests pending for a same user;
    determining that an amount of idle compute capacity does not meet or exceed an availability threshold; and
    suspending processing of the file for a period of time.

5. The computer-implemented method of claim 1, wherein:
    the second response comprises a HyperText Transfer Protocol (HTTP) response message sent in response to the second request, the second request comprising an HTTP request message;
    the HTTP request message was received at a first Application Programming Interface (API) endpoint; and
    the method further comprises:
        sending another HTTP request message to another endpoint associated with an analysis service, the another HTTP request message including data of the file or identifying a location of the file, and receiving another HTTP response message from the another endpoint.

6. The computer-implemented method of claim 1, wherein at least one of the one or more corresponding segment types comprises one of: form, receipt, invoice, paragraph, or table.

7. The computer-implemented method of claim 6, wherein:
at least one of the one or more corresponding segment types is form; and
the processing of at least one of the one or more segments using the analysis engine comprises:
identifying a plurality of keys of the form and a plurality of values of the form; and
determining a plurality of key-value pairings, wherein at least one of the plurality of key-value pairings comprises one of the plurality of keys and one of the plurality of values that corresponds to the one key.

8. The computer-implemented method of claim 7, wherein:
identifying the plurality of keys and the plurality of values is based on use of a second one or more ML models; and
determining the plurality of key-value pairings is based on use of a third one or more ML models.

9. The computer-implemented method of claim 1, wherein the second request is received at a web service endpoint of a provider network, and wherein the second response is destined to a client device located outside of the provider network.

10. The computer-implemented method of claim 1, wherein the file comprises an electronic image taken of the document.

11. A system comprising:
a storage service implemented by a first one or more electronic devices within a provider network; and
a document processing service implemented by a second one or more electronic devices within the provider network, the document processing service including instructions that upon execution cause the document processing service to:
receive a first request to analyze a document encoded by a file, the first request identifying a location provided by the storage service that stores the file;
generate a job identifier (ID) of a job;
transmit the job ID within a first response, wherein the first response is associated with the first request;
obtain the file from the storage service;
identify, within at least a portion of the document, one or more segments;
determine, via use of one or more machine learning (ML) models, a classification of each of the one or more segments into one or more corresponding segment types;
process each of the one or more segments using an analysis engine selected based the determined segment type for the segment to yield one or more results;
receive a second request for an output of the job, the second request comprising the job ID; and
transmit a second response including an output based on the one or more results wherein the second response is associated with the second request.

12. The system of claim 11, wherein the instructions further cause the document processing service to:
split the file into a plurality of chunks;
analyze, at least partially in a parallel manner, the plurality of chunks to yield a plurality of chunk results, wherein the portion is from a first chunk of the plurality of chunks;
determine that the plurality of chunks have all been analyzed; and
combine the plurality of chunk results into the output.

13. The system of claim 11, wherein the instructions further cause the document processing service to:
determine that a value meets or exceeds a threshold, the threshold comprising a size, a number of pages of the file, or an amount of requests pending for a same user;
determine that an amount of idle compute capacity does not meet or exceed an availability threshold; and
suspend processing of the file for a period of time.

14. The system of claim 11, wherein the second request is carried by a HyperText Transfer Protocol (HTTP) request message received at a web service endpoint of the provider network, and wherein the second response is carried by an HTTP response message destined to a client device located outside of the provider network.

15. A computer-implemented method comprising:
receiving a request to analyze a document encoded by a file;
identifying, within at least a portion of the document, one or more segments;
determining, via use of one or more machine learning (ML) models, a classification of each of the one or more segments into one or more corresponding segment types, wherein at least one segment type of the one or more corresponding segment types is a form;
processing each of the one or more segments using an analysis engine selected based on the determined segment type for the segment to yield one or more results, the processing for each segment comprising:
identifying a plurality of keys of the form and a plurality of values of the form; and
determining a plurality of key-value pairings, wherein at least one of the plurality of key-value pairings comprises one of the plurality of keys and one of the plurality of values that corresponds to the one key; and
transmitting a response including an output based on the one or more results.

16. The computer-implemented method of claim 15, wherein:
identifying the plurality of keys and the plurality of values is based on use of a second one or more ML models; and
determining the plurality of key-value pairings is based on use of a third one or more ML models.

17. The computer-implemented method of claim 15, wherein the request includes data of the file or identifies a location of the file.

18. A system comprising:
a storage service implemented by a first one or more electronic devices within a provider network; and
a document processing service implemented by a second one or more electronic devices within the provider network, the document processing service including instructions that upon execution cause the document processing service to:
receive a request to analyze a document encoded by a file, the request identifying a location provided by the storage service that stores the file;
obtain the file from the storage service;

identify, within at least a portion of the document, one or more segments;

determine, via use of one or more machine learning (ML) models, a classification of each of the one or more segments into one or more corresponding segment types, wherein at least one of the one or more corresponding segment types for a corresponding one of the segments is a form;

process each of the one or more segments using an analysis engine selected based the determined segment type for the segment to yield one or more results, wherein to process each segment the document processing service is to:

identify a plurality of keys of the form and a plurality of values of the form; and determine a plurality of key-value pairings, wherein at least one of the plurality of key-value pairings comprises one of the plurality of keys and one of the plurality of values that corresponds to the one key; and transmit a response including an output based on the one or more results.

19. The system of claim 18, wherein:

the identification of the plurality of keys and the plurality of values is based on use of a second one or more ML models; and the determination of the plurality of key-value pairings is based on use of a third one or more ML models.

20. The system of claim 18, wherein the document processing service further includes instructions that upon execution cause the document processing service to:

determine that a value meets or exceeds a threshold, the value comprising a size of the file, a number of pages of the file, or an amount of requests pending for a same user;

determine that an amount of idle compute capacity does not meet or exceed an availability threshold; and suspend processing of the file for a period of time.

\* \* \* \* \*